(12) United States Patent
Ogawa et al.

(10) Patent No.: US 11,204,521 B2
(45) Date of Patent: Dec. 21, 2021

(54) LIGHTING DEVICE WITH SUBSTRATE AND REFLECTIVE SHEET AND DISPLAY DEVICE HAVING LIGHTING DEVICE WITH SUBSTRATE AND REFLECTIVE SHEET

(71) Applicant: Funai Electric Co., Ltd., Osaka (JP)

(72) Inventors: Akihisa Ogawa, Osaka (JP); Tatsuya Ito, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/020,930

(22) Filed: Sep. 15, 2020

(65) Prior Publication Data

US 2021/0088846 A1  Mar. 25, 2021

(30) Foreign Application Priority Data

Sep. 20, 2019 (JP) .............................. JP2019-172264

(51) Int. Cl.
*G02F 1/13357* (2006.01)
(52) U.S. Cl.
CPC .. *G02F 1/133605* (2013.01); *G02F 1/133603* (2013.01)
(58) Field of Classification Search
CPC ......... G02F 1/133605; G02F 1/133603; G02F 1/133611; G02F 1/133608; G02F 2201/54
See application file for complete search history.

(56) References Cited

U.S. PATENT DOCUMENTS

| 2010/0309683 | A1 | 12/2010 | Tsai | |
|---|---|---|---|---|
| 2012/0120656 | A1 | 5/2012 | Ajichi et al. | |
| 2013/0271999 | A1* | 10/2013 | Shiobara | F21V 7/24 362/341 |
| 2015/0308675 | A1* | 10/2015 | Takase | F21V 29/503 349/69 |
| 2019/0094618 | A1 | 3/2019 | Kyoukane et al. | |
| 2019/0310515 | A1* | 10/2019 | Teragawa | G02F 1/133385 |
| 2021/0018797 | A1* | 1/2021 | Kobayashi | G02F 1/133606 |
| 2021/0018798 | A1* | 1/2021 | Kobayashi | G02F 1/133606 |

FOREIGN PATENT DOCUMENTS

JP  2019-61929 A  4/2019

OTHER PUBLICATIONS

The extended European search report for the corresponding European application No. 20196242.0, dated Jan. 26, 2021.

\* cited by examiner

*Primary Examiner* — Tracie Y Green
(74) *Attorney, Agent, or Firm* — Global IP Counselors, LLP

(57) ABSTRACT

A lighting device includes a light source, a substrate and a reflective sheet. The light source is mounted on the substrate. The substrate includes a substrate side opening in a vicinity of the light source. The reflective sheet is provided to cover a surface of the substrate. The reflective sheet includes a reflective sheet side opening at a location corresponding to the light source. The substrate side opening is arranged such that an inner edge portion of the reflective sheet side opening is inserted thereto or the light source is fixed thereto.

21 Claims, 13 Drawing Sheets

LIGHTING DEVICE WITH SUBSTRATE AND REFLECTIVE SHEET AND DISPLAY DEVICE HAVING LIGHTING DEVICE WITH SUBSTRATE AND REFLECTIVE SHEET

CROSS-REFERENCE TO RELATED APPLICATIONS

This application claims priority to Japanese Patent Application No. 2019-172264 filed on Sep. 20, 2019. The entire disclosure of Japanese Patent Application No. 2019-172264 is hereby incorporated herein by reference.

BACKGROUND

Field of the Invention

This invention generally relates to a lighting device and a display device. More specifically, the present invention relates to a lighting device and a display device equipped with a reflective sheet that expands and contracts with heat.

Background Information

Generally, lighting devices and display devices equipped with a reflective sheet that expands and contracts with heat are known (see Japanese Patent Application Publication No. 2019-61929 (Patent Literature 1), for example).

The above-described Patent Literature 1 discloses a lighting device (display device) comprising a light-emitting element, a substrate on which the light-emitting element is mounted, and a reflective sheet provided on the substrate. The reflective sheet includes an aperture provided to overlap with the light-emitting element. As viewed from a perpendicular direction relative to the substrate, the aperture is provided such that an edge of the aperture is separated from the light-emitting element by a predetermined distance. This makes it possible to suppress the edge of the aperture (the inner peripheral edge portion) of the above-mentioned aperture from contacting the light-emitting element, even when the reflective sheet is expanded by heat. As a result, it is possible to suppress damage to the reflective sheet (the edge of the aperture) caused by the edge of the aperture (the inner peripheral edge portion) expanding further (towards the light-emitting element side) in a state where the edge of the aperture (the inner peripheral edge portion) is in contact with the light-emitting element.

SUMMARY

However, in the above-described Patent Literature 1, to avoid contact between the edge of the aperture (the inner peripheral edge portion) of the reflective sheet and the light-emitting element (light source) even when the reflective sheet is expanded by heat, the edge of the aperture and the light-emitting element must be arranged to be spaced apart from each other. As a result, there is no reflective sheet between the above-mentioned edge of the aperture and the light-emitting element, and thus the area of the exposed surface of the substrate becomes large. As a result, the percentage of light that is not reflected by the reflective sheet but is reflected by the substrate, which has a lower reflectivity than the reflective sheet, becomes greater, and therefore the amount of light absorbed by the surface of the substrate (light absorption loss) becomes greater. In this case, there is the disadvantage that the reflection efficiency of light in the lighting device (display device) is reduced. In other words, with the lighting device and the display device described in the above-mentioned Patent Literature 1, it is difficult to suppress a decrease in the reflection efficiency of light in the lighting device (display deice).

This invention has been made to solve the above-mentioned problems, and one object of this invention is to provide a lighting device and a display device capable of suppressing a decrease in the reflection efficiency of light in a lighting device (display device) while suppressing damage to a reflective sheet (an inner edge portion of the opening).

In view of the state of the known technology and in accordance with a first aspect of the present invention, a lighting device comprises a light source, a substrate and a reflective sheet. The light source is mounted on the substrate. The substrate includes a substrate side opening in a vicinity of the light source. The reflective sheet is provided to cover a surface of the substrate. The reflective sheet includes an inner edge portion defining a reflective sheet side opening at a location corresponding to the light source. The substrate side opening is arranged such that the inner edge portion of the reflective sheet is inserted thereto or the light source is fixed thereto.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (Configuration of a Backlight Unit and a Liquid Crystal Television Device)

Referring to FIGS. 1 to 8, the configuration of a backlight unit 10 and a liquid crystal television device 100 according to a first embodiment will be described. Here, the backlight unit 10 and the liquid crystal television device 100 are examples of the "lighting device" and the "display device" of the present disclosure, respectively.

Figure 1:
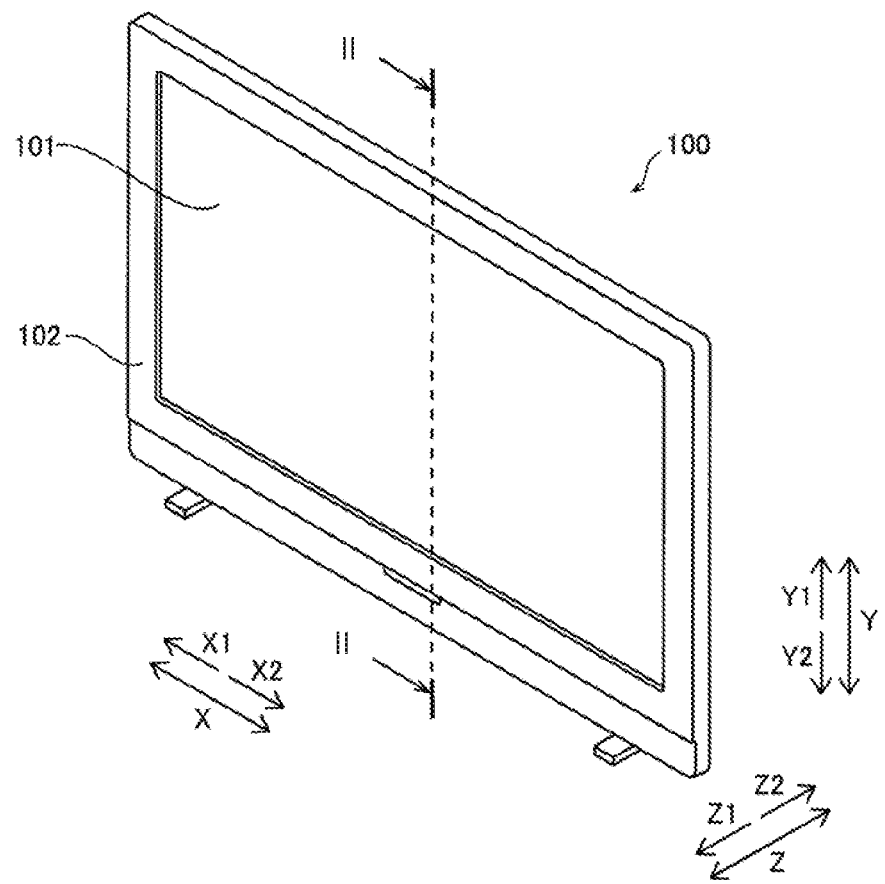
FIG. 1 is a perspective view illustrating the overall configuration of a liquid crystal television device in accordance with a first embodiment.

The liquid crystal television device 100 according to the first embodiment has a display 101 and a housing 102, as shown in FIG. 1.

Figure 2:
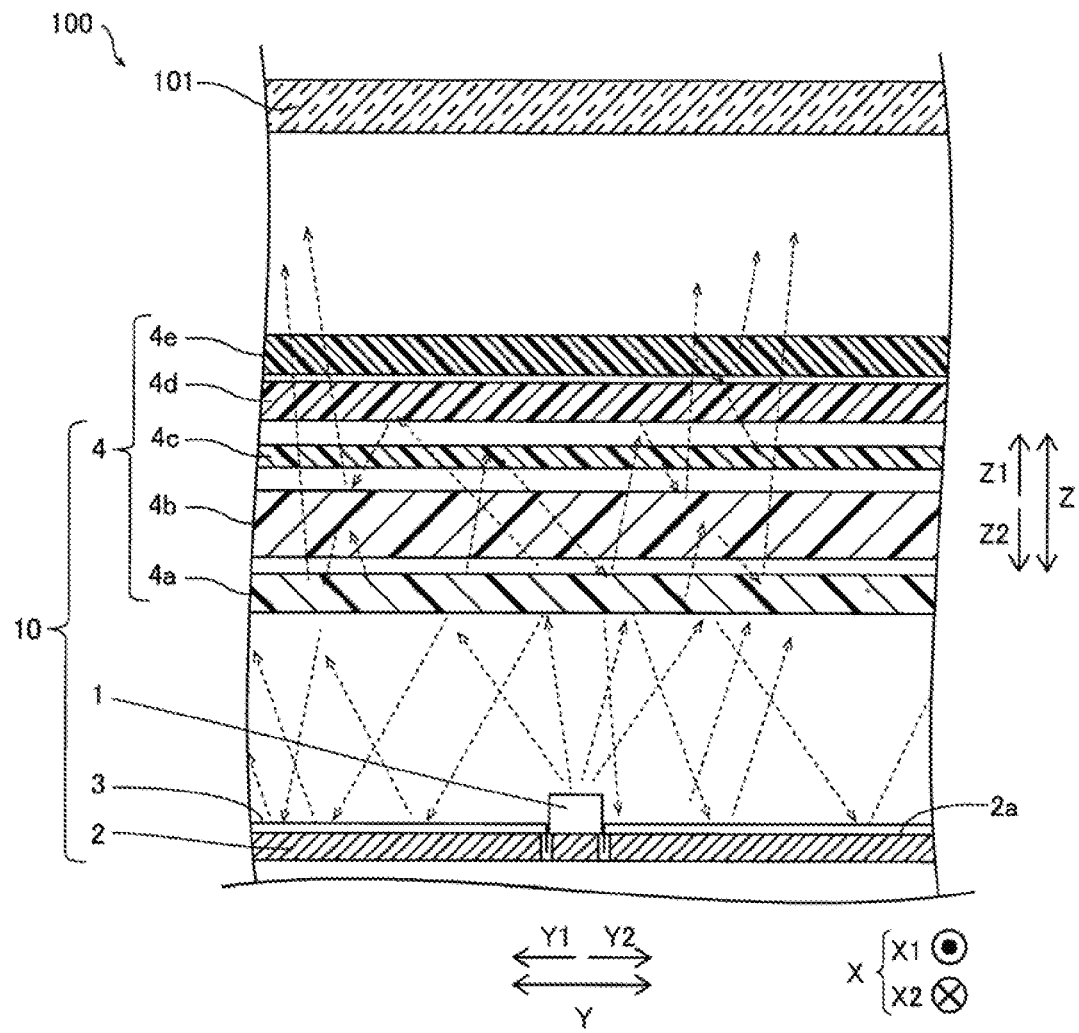
FIG. 2 is a cross-sectional view taken along II-II line of FIG. 1.

As shown in FIG. 2, the liquid crystal television device 100 is provided with a backlight unit 10. The backlight unit 10 (the liquid crystal television device 100) comprises an LED 1, a substrate 2, and a reflective sheet 3. The LED 1 emits light onto the display 101. The dashed arrows in FIG. 2 indicate the light path of the light. The LED 1 is an example of the "light source" of the present disclosure.

Figure 3:
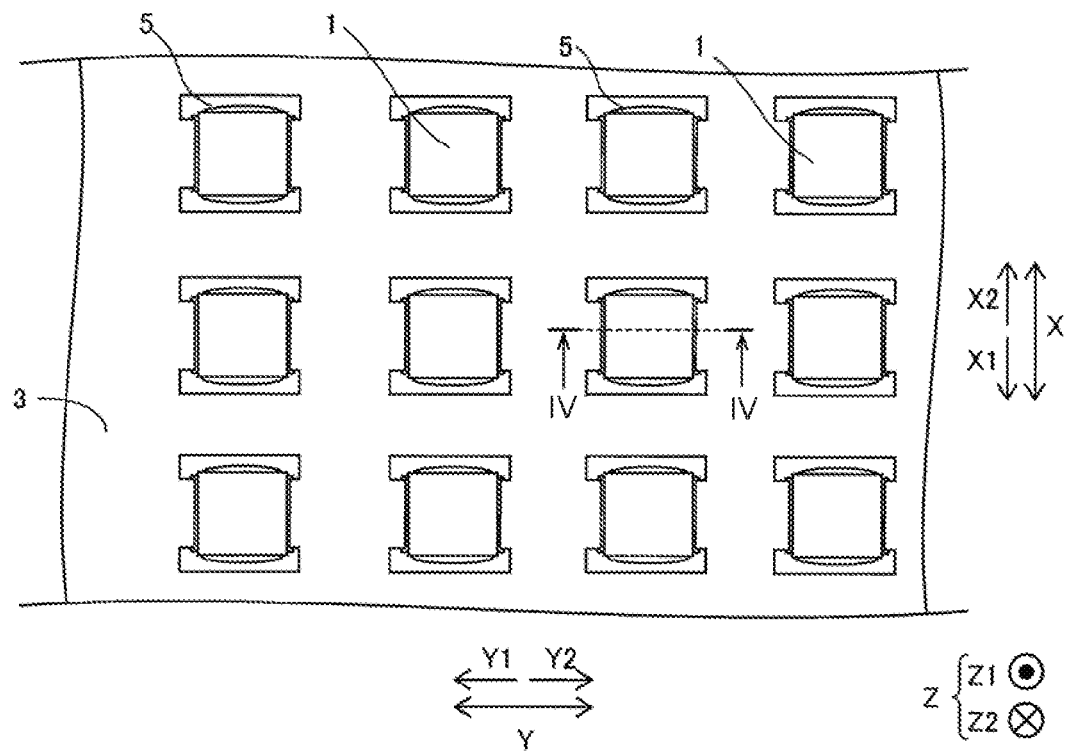
FIG. 3 is a plan view of a reflective sheet and a plurality of LEDs in accordance with the first embodiment.

The LED 1 is mounted on the substrate 2. Specifically, the LED 1 is fixed to a surface (or front surface) 2a of the substrate 2. The LED 1 includes a phosphor 1a (see FIG. 5) and a package 1b (see FIG. 5) that houses the phosphor 1a. In the illustrated embodiment, the phosphor 1a forms a light-emitting region of the LED 1 that emits the light, for example. As shown in FIG. 3, multiple LEDs 1 are arranged in a matrix (see FIG. 3) as viewed from a perpendicular direction (from a Z1 direction side) perpendicular to the surface 2a of the substrate 2a. In the illustrated embodiment, the configuration of the backlight unit 10 around each LED 1 is the same with each other, and thus the configuration of the backlight unit 10 around one LED 1 will be described below for the sake of brevity. The phosphor 1a and the package 1b are examples of the "light-emitting element" and the "light-emitting element housing" of the present disclosure, respectively.

The reflective sheet 3 is provided to cover the surface 2a of the substrate 2. An adhesive not shown is applied between the surface 2a of the substrate 2 and the reflective sheet 3 for fixing the reflective sheet 3 to the surface 2a of the substrate 2. Thereby, the reflective sheet 3 is adhered to the surface 2a of the substrate 2. Here, a pair of inner edge portions 3b defining an opening 3a of the reflective sheet 3, which will be described below, is not adhered to the substrate 2 by the above-mentioned adhesive. In FIG. 2, the reflective sheet 3 is schematically illustrated as if the reflective sheet 3 is floating from the surface 2a of the substrate 2 in order to illustrate the reflective sheet 3 in an easy-to-understand manner. Alternatively, the reflective sheet 3 can merely be placed on the surface 2a of the substrate 2 without being adhered to the surface 2a of the substrate 2.

The reflective sheet 3 is configured to expand and contract by heat. The reflective sheet 3 is configured such that, of Y and X directions that are perpendicular to each other as viewed from the perpendicular direction, the amount of expansion and contraction (length of expansion and contraction) due to heat in the Y direction is greater than the amount of expansion and contraction due to heat in the X direction. Thus, the reflective sheet 3 is configured such that a thermal expansion amount in the Y direction of the reflective sheet 3 is greater than a thermal expansion amount in the X direction of the reflective sheet 3. The Y direction refers to the short side direction of the liquid crystal television device 100 (see FIG. 1). The X direction refers to the long side direction of the liquid crystal television device 100 (see FIG. 1). The Y direction and the X direction are examples of the "first direction" and the "second direction" of the present disclosure, respectively. Here, the thermal expansion amount or thermal expansion of a material refers to the change amount of the length of the material in response to a change in temperature, and usually becomes larger (expansion) with increasing temperature. Thus, in the illustrated embodiment, the reflective sheet 3 expands in the Y direction more than in the X direction with increasing temperature, while the reflective sheet 3 contracts in the Y direction more than in the X direction with decreasing temperature, for example. Thus, in the illustrated embodiment, the reflective sheet 3 is made of a material with a positive thermal expansion. Furthermore, the reflective sheet 3 can also be made of a material with a positive thermal expansion at least within a range of a predetermined operating temperature of the liquid crystal television device 100. However, the reflective sheet 3 can be made of a material with a negative thermal expansion or thermal contraction with which the material contract on heating.

The backlight unit 10 also includes an optical sheet section 4. The optical sheet section 4 includes a light homogenizing sheet 4a, a diffuser 4b, a prism sheet 4c, a reflective polarization film 4d, and a louver sheet 4e. The light emitted from the LED 1 and polarized (adjusted to go straight in a predetermined direction) by passing through the optical sheet section 4 is irradiated onto the display 101. Also, a portion of the light emitted from the LED 1 and irradiated on the optical sheet section 4 is reflected to the reflective sheet 3 side. The light reflected by the optical sheet section 4 to the reflective sheet 3 is reflected by the reflective sheet 3 to the optical sheet section 4 side (display 101 side) (the Z1 direction side). The reflectivity of the reflective sheet 3 is greater than the reflectivity of the surface 2a of the substrate 2 and the reflectivity of soldered portions 5, which will be described later.

Figure 4:
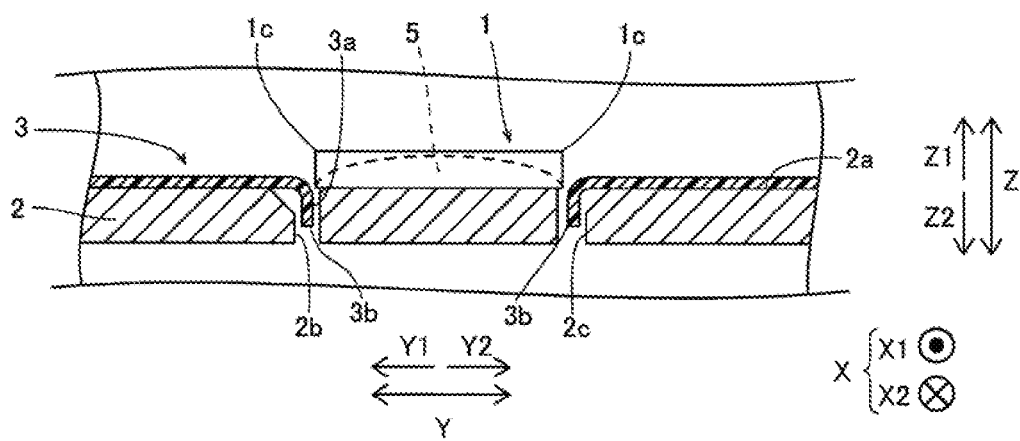
FIG. 4 is a cross-sectional view taken along IV-IV line of FIG. 3.

As shown in FIG. 4, the reflective sheet 3 includes the opening 3a at a location corresponding to the LED 1.

Figure 5:
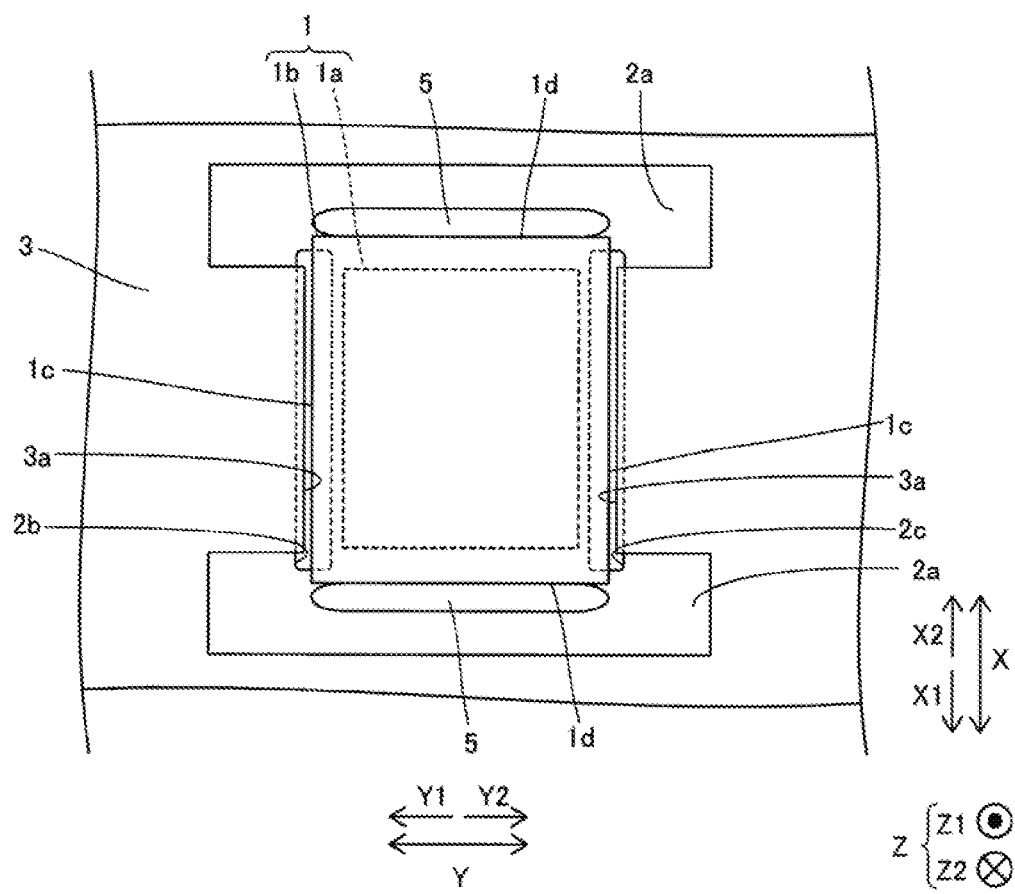
FIG. 5 is an enlarged plan view of the vicinity of the LED shown in FIG. 3.

Specifically, the opening 3a is formed in the area where the LED 1 is disposed as viewed from the perpendicular direction perpendicular to the surface 2a of the substrate 2 (as viewed from the Z1 direction side). Thus, as shown in FIG. 4, the LED 1 is disposed through the opening 3a. As mentioned above, the backlight unit 10 includes multiple LEDs 1, and thus the reflective sheet 3 also includes multiple openings 3a at locations corresponding to the multiple LEDs 1. However, the configuration of each opening 3a is the same with each other, and thus the configuration of one opening 3a will be described below for the sake of brevity. As shown in FIG. 5, the opening 3a surrounds the region in which the LED 1 is disposed and the region in which the soldered portions 5 are disposed (land portions 5a, see FIG. 6), which will be described later. That is, the surface 2a of the substrate 2 around the soldered portions 5 is exposed from the reflective sheet 3. The opening 3a is an example of the "reflective sheet side opening" of the present disclosure.

As shown in FIG. 4, the substrate 2 includes a through hole 2b and a through hole 2c provided in the vicinity of the LED 1. Each of the through hole 2b and the through hole 2c is provided to penetrate the substrate 2 along the perpendicular direction (the Z direction). Specifically, each of the through hole 2b and the through hole 2c is provided to extend in the perpendicular direction (the Z direction). The through hole 2b and the through hole 2c are provided separately from each other. The through hole 2b is an example of the "substrate side opening (or additional substrate side opening)," the "first through hole," and the "first opening (or second opening)" of the present disclosure. The through hole 2c is an example of the "additional substrate side opening (or substrate side opening)," the "first through hole," and the "second opening (or first opening)" of the present disclosure. In the illustrated embodiment, the substrate 2 includes the pair of the through holes 2b and 2c for each LED 1. As mentioned above, the backlight unit 10 includes multiple LEDs 1, and thus the substrate 2 includes multiple pairs of through holes 2b and 2c at locations corresponding to the multiple LEDs 1. However, the configuration of each pair of the through holes 2b and 2c is the same with each other, and thus the configuration of one pair of the through holes 2b and 2c will be described below for the sake of brevity.

Here, in the first embodiment, the through holes 2b and 2c are provided such that the inner edge portions 3b of the opening 3a are inserted thereto, respectively, so as to avoid contact between the inner edge portions 3b of the reflective sheet 3 in an expanded state by heat and the LED 1. Specifically, the inner edge portions 3b of the opening 3a, which are provided to surround the LED 1, are inserted into the through holes 2b and 2c, respectively, to sandwich the LED 1 in the Y direction. In the following, the inner edge portions 3b mean the portions inserted into the through holes 2b and 2c. Specifically, as shown in FIG. 5, as viewed in the Z direction, the opening 3a of the reflective sheet 3 has a pair of wide sections forming end sections of the opening 3a in the X direction, and a narrow section that is disposed between the wide sections in the X direction and is narrower in the Y direction than the wide sections. The inner edge portions 3b are formed as opposite edge portions of the narrow section of the opening 3a that are opposite to each other in the Y direction. Thus, the inner edge portions 3b at least partially defines the opening 3a. In the present disclosure, for the sake of brevity, the inner edge portions 3b defining the opening 3a is also referred to as the inner edge portions 3b of the opening 3a. Also, in the illustrated embodiment, as shown in FIG. 5, the inner edge portions 3b have the length in the X direction that are slightly shorter than the lengths of the through holes 2b and 2c in the X direction. More specifically, in the illustrated embodiment, the lengths of the inner edge portions 3b in the X direction are substantially the same as or slightly greater than the length of the phosphor 1a that defines the light-emitting region of the LED 1, but smaller than the length of the package 1b.

The inner edge portions 3b of the opening 3a may be inserted into the through holes 2b and 2c, respectively, by folding the reflective sheet 3, or may be inserted into the through holes 2b and 2c, respectively, by bending the reflective sheet 3. Specifically, in the illustrated embodiment, the inner edge portions 3b are folded or bent rearward (towards a Z2 direction) relative to a main portion of the reflective sheet 3 that is disposed on the surface 2a of the substrate 2.

In the first embodiment, as shown in FIG. 5, the through holes 2b and 2c are provided so as to overlap with the LED 1 as viewed from the perpendicular direction (the Z1 direction side). Specifically, each of the through holes 2b and 2c is provided such that only a portion of the through holes 2b and 2c overlap with the LED 1 as viewed from the perpendicular direction. More specifically, only a portion of the through hole 2b on the LED 1 side (a Y2 direction side) overlaps with the LED 1 as viewed from the perpendicular direction. Also, only a portion of the through hole 2c on the LED 1 side (a Y1 direction side) overlaps with LED 1 as viewed from the perpendicular direction.

The reflective sheet 3 (the inner edge portions 3b) is then inserted into the through hole 2b and 2c, respectively, through portions of the through hole 2b and 2c that do not overlap with the LED 1 as viewed from the perpendicular direction (the Z1 direction side).

Here, the LED 1 has a rectangular shape as viewed from the perpendicular direction (the Z1 direction side). Specifically, the LED 1 has a pair of edges 1c opposite to each other in the Y direction. In the first embodiment, the through hole 2b is provided in the vicinity of one of the edges 1c of the LED 1 in the Y direction (the Y1 direction side) as viewed from the perpendicular direction. The through hole 2c is provided in the vicinity of the other one of the edges 1c in the Y direction (the Y2 direction side) as viewed from the perpendicular direction.

Specifically, the through hole 2b is provided to overlap with the one of the edges 1c (the Y1 direction side) as viewed from the perpendicular direction (the Z1 direction side). The through hole 2c is provided to overlap with the other one of the edges 1c (the Y2 direction side) as viewed from the perpendicular direction.

In the first embodiment, each of the through hole 2b and the through hole 2c is provided in the form of a slit extending along a direction in which the edges 1c of the LED 1 extend (the X direction). That is, the through hole 2b and the through hole 2c each have a rectangular shape (see FIG. 6) having long sides along the X direction. Specifically, the through hole 2b and the through hole 2c are provided to extend from the vicinity of one of a pair of edges 1d of the LED 1 in the X direction to the vicinity of the other one of the pair of the edges 1d of the LED 1 in the X direction. In the illustrated embodiment, as shown in FIG. 5, the through holes 2b and 2c have the lengths in the X direction that are slightly shorter than the length of the LED 1 in the X direction. More specifically, in the illustrated embodiment, the lengths of the through holes 2b and 2c in the X direction are greater than the length of the phosphor 1a that defines the light-emitting region of the LED 1, but smaller than the length of the package 1b.

Figure 6:
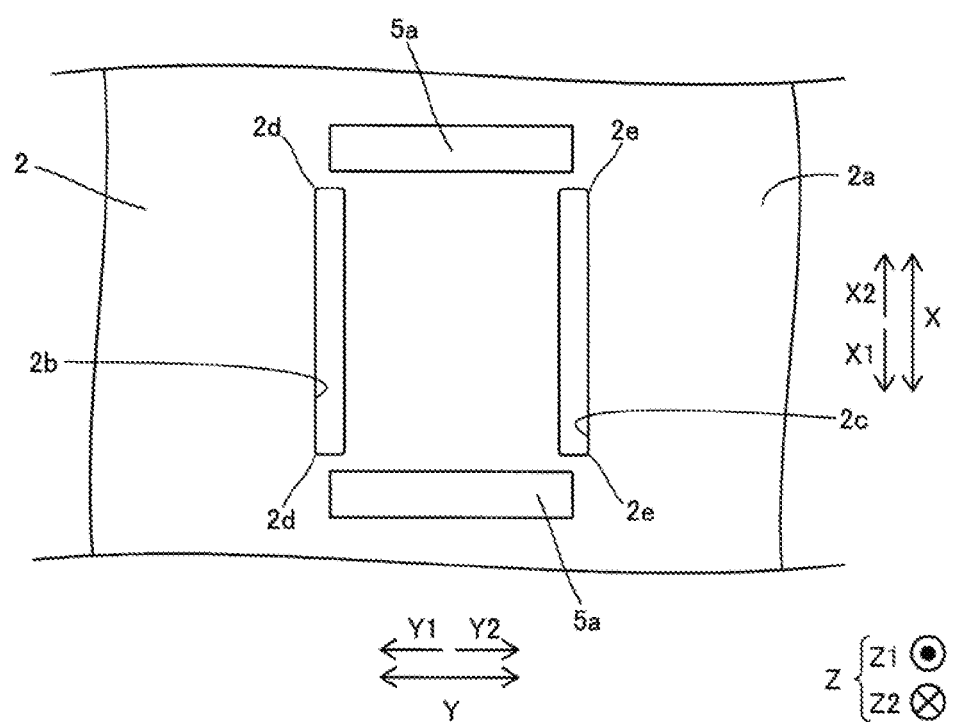
FIG. 6 is an enlarged plan view of the vicinity of a through hole in a substrate of a backlight unit in accordance with the first embodiment.

As shown in FIG. 6, each of four corners 2d of the through hole 2b has an R shape or a rounded shape. Also, each of four corners 2e of the through hole 2c has an R shape or a rounded shape. Specifically, the corners 2d and 2e of the through holes 2b and 2c are rounded to form interior corners with fillets (or chamfer). The through holes 2b and 2c each may have a rectangular shape with four corners at right angles as viewed from the perpendicular direction (the Z1 direction side), or each may have an oval shape, a semicircular shape (semicylindrical shape), or a rhombus shape.

Figure 7:
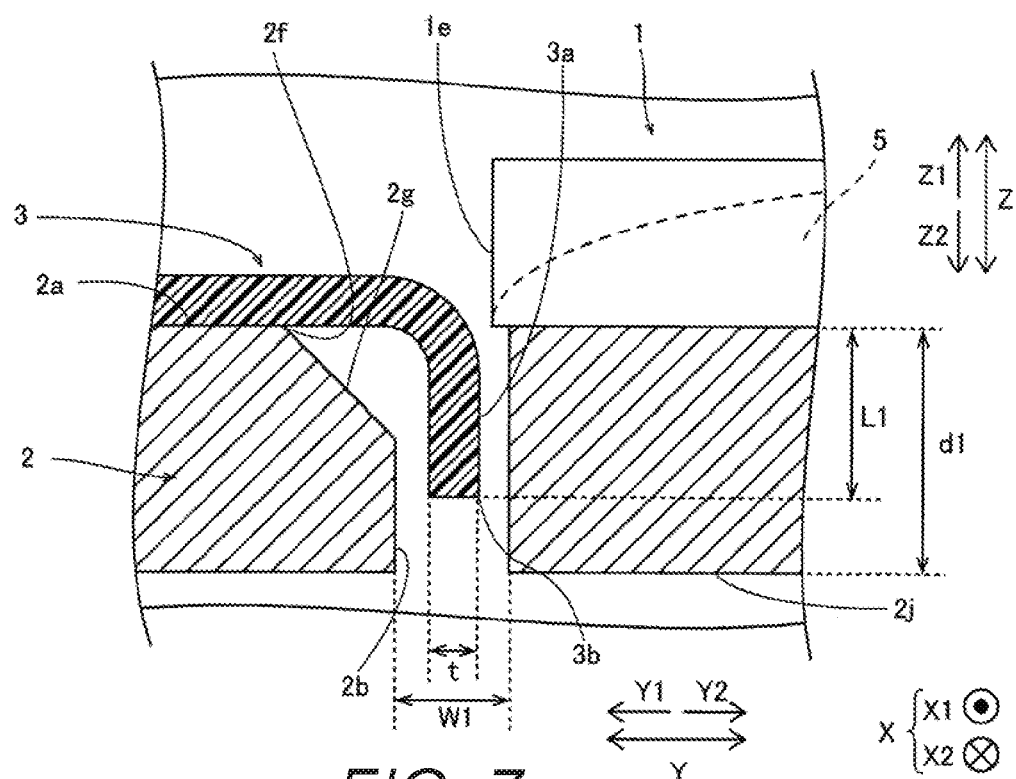
FIG. 7 is an enlarged cross-sectional view of the vicinity of the through hole in a Y1 direction side of FIG. 4.
Figure 8:
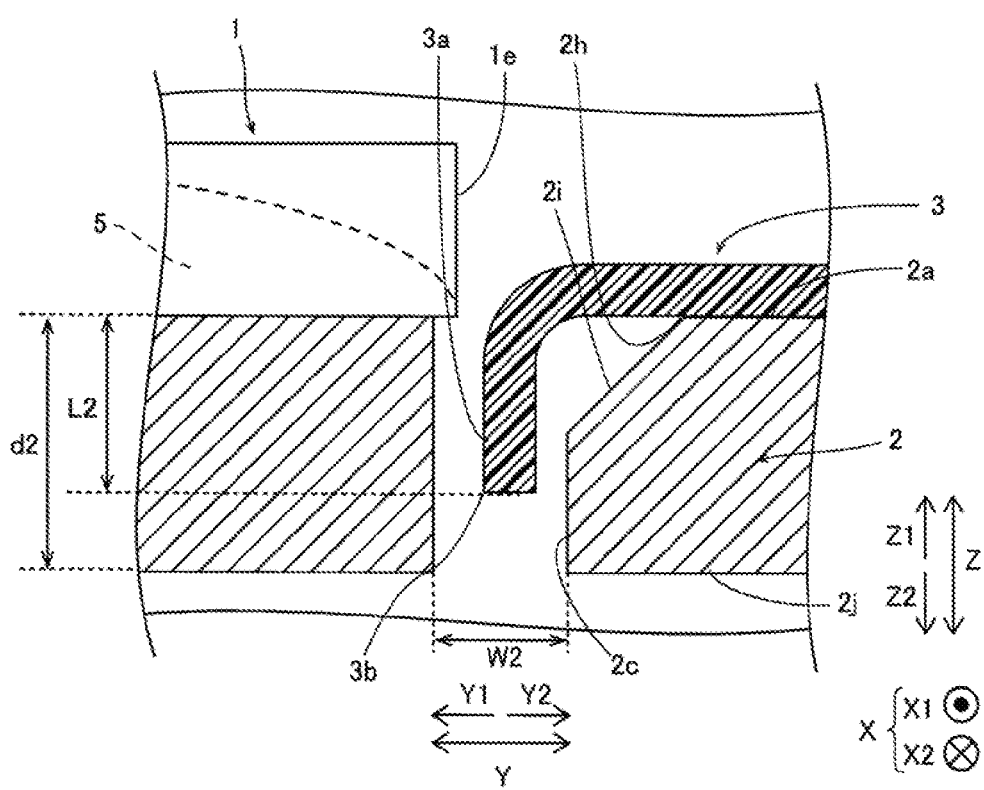
FIG. 8 is an enlarged cross-sectional view of the vicinity of the through hole in a Y2 direction side of FIG. 4.

In the first embodiment, as shown in FIGS. 7 and 8, the through holes 2b and 2c each have opening ends 2f and 2h on the surface 2a of the substrate 2. Specifically, as shown in FIG. 7, a corner 2g of the opening end 2f of the through hole 2b in which the inner edge portion 3b of the opening 3a is inserted is chamfered. Also, as shown in FIG. 8, a corner 2i of the opening end 2h of the through hole 2c in which the inner edge portion 3b of the opening 3a is inserted is chamfered. Specifically, each of the corner 2g (see FIG. 7) and the corner 2i (see FIG. 8) is C-chamfered. Each of the opening end 2f (see FIG. 7) and the opening end 2h (see FIG. 8) is an opening end on the surface 2a side of the substrate 2. The opening end 2f and the opening end 2h are examples of the "first opening end" of the present disclosure.

The width W1 (see FIG. 7) of the through hole 2b in the Y direction is greater than twice the thickness t of the reflective sheet 3 (see FIG. 7). The width W2 (see FIG. 8) of the through hole 2c in the Y direction of the through hole 2c is greater than twice the thickness t of the reflective sheet 3. Specifically, the width W1 (W2) of the through hole 2b (2c) is, for example, about 1 mm. The thickness t of the reflective sheet 3 is, for example, about 0.2 mm. That is, the width W1 (W2) of the through hole 2b (2c) is about 5 times the thickness t of the reflective sheet 3. FIGS. 7 and 8 are schematic diagrams, and the relationship between the width W1 (W2) and the thickness t is different from the actual size of the sheet.

The reflective sheet 3 expands and contracts in a direction along a pair of side surfaces 1e of the LED 1 extending along the perpendicular direction (the Z direction) by having the inner edge portions 3b of the opening 3a inserted into the through holes 2b and 2c, respectively. In other words, the reflective sheet 3 expands and contracts in the perpendicular direction as guided by the side surfaces 1e of the LED 1 and the through holes 2b and 2c. The pair of the side surfaces 1e are a pair of side surfaces of the LED 1 that are opposed to each other in the Y direction.

Each of the length L1 (see FIG. 7) of the reflective sheet 3 inserted in the through hole 2b and the length L2 (see FIG. 8) of the reflective sheet 3 inserted in the through hole 2c is greater than the thickness t of the reflective sheet 3. In particular, in the illustrated embodiment, the inner edge portions 3b of the reflective sheet 3 are inserted into the through holes 2b and 2c by the lengths L1 and L2, respectively, that are greater than the thickness t of the reflective sheet 3. Specifically, each of the length L1 and the length L2 is, for example, 0.5 mm or more.

The length L1 (see FIG. 7) of the reflective sheet 3 inserted in the through hole 2b is greater than ½ (half) of the depth d1 (see FIG. 7) (e.g., 1 mm) of the through hole 2b. The length L2 (see FIG. 8) of the reflective sheet 3 inserted in the through hole 2c is greater than ½ (half) of the depth d2 (see FIG. 8) of the through hole 2c. Specifically, the lengths L1 and L2 of the reflective sheet 3 inserted in the through holes 2b and 2c are dimensioned such that the inner edge portions 3b of the opening 3a do not exit from the through holes 2b and 2c to the surface 2a side (the Z1 direction side) of the substrate 2a (the inner edge portions 3b do not come out of the through holes 2b and 2c) even when the reflective sheet 3 is contracted.

The lengths L1 and L2 of the reflective sheet 3 inserted in the through holes 2b and 2c are preferably dimensioned such that the inner edge portions 3b of the opening 3a do not exit (do not protrude) from a back surface 2j of the substrate 2 through the through holes 2b and 2c, respectively, even when the reflective sheet 3 is expanded. This makes it possible to prevent the inner edge portions 3b of the opening 3a from coming into contact with a rear frame not shown on the back side (the Z2 direction side) of the substrate 2 when the reflective sheet 3 is expanded. The back surface 2j of the substrate 2 is the opposite surface of the surface 2a of the substrate 2.

The length L1 of the reflective sheet 3 inserted in the through hole 2b and the length L2 of the reflective sheet 3 inserted in the through hole 2c are approximately equal to each other. However, the lengths L1 and L2 can be different from each other.

The backlight unit 10 (the liquid crystal television device 100) includes the soldered portions 5 that bond the LED 1 to the surface of the substrate 2. Each of the soldered portions 5 is provided to extend along each of the edges 1d (see FIG. 5) of the LED 1. The soldered portions 5 are provided on the land portions 5a (see FIG. 6), respectively.

(Experimental Results)

Compared with a conventional configuration without a through hole in a substrate (see Patent Literature 1 above), the experimental results show that the reflection efficiency of the light in the backlight unit 10 (the liquid crystal television device 100) is improved by 2 to 10% when the backlight unit 10 is configured as described above.

Effect of the First Embodiment

In the first embodiment, the following effects can be achieved.

In the first embodiment, as described above, the substrate 2 includes the through holes 2b and 2c provided in the vicinity of the LED 1. The backlight unit 10 is configured such that the through holes 2b and 2c are provided such that the inner edge portions 3b of the opening 3a are inserted thereto so as to avoid contact between the inner edge portions 3b of the reflective sheet 3 in the expanded state by heat and the LED 1. Thus, by providing the through holes 2b and 2c, contact between the inner edge portions 3b of the opening 3a and the LED 1 can be avoided when the reflective sheet 3 is expanded by heat. As a result, it is possible to suppress the damage to (and wrinkling of) the inner edge portions 3b of the opening 3a due to further expanding of the reflective sheet 3 by heat (towards the LED 1) in a state where the inner edge portions 3b of the opening 3a are in contact with the LED 1. Furthermore, by providing the through holes 2b and 2c in the vicinity of the LED 1, even when the inner edge portions 3b of the opening 3a are arranged so that the inner edge portions 3b of the opening 3a extend to the vicinity of the LED 1 as viewed from the perpendicular direction, the through holes 2b and 2c provided in the vicinity of the LED 1 can avoid contact between the inner edge portions 3b of the opening 3a and the LED 1. As a result, exposure of the surface 2a of the substrate 2 in the vicinity of the LED 1 can be suppressed as much as possible, and thus a decrease in the reflection efficiency of the light in the backlight unit 10 can be suppressed while suppressing the damage to the reflective sheet 3 (the inner edge portions 3b of the opening 3a).

In the first embodiment, as described above, the backlight unit 10 is configured such that the through holes 2b and 2c are provided to overlap with the LED 1 as viewed from the perpendicular direction. Thus, exposure of the surface 2a of the substrate 2 in the vicinity of the LED 1 can be more reliably suppressed. As a result, a decrease in the reflection efficiency of the light in the backlight unit 10 can be more effectively suppressed.

In the first embodiment, the backlight unit 10 is configured such that the inner edge portions 3b of the opening 3a are inserted into the through holes 2b and 2c, as described above. Thus, by inserting the inner edge portions 3b of the opening 3a into the through holes 2b and 2c, contact between the inner edge portions 3b of the opening 3a and the LED 1 can be easily avoided.

In the first embodiment, as described above, the backlight unit 10 is configured such that the through hole 2b is provided in the vicinity of one of the pair of the edges 1c of the LED 1 in the Y direction as viewed from the perpendicular direction, and the through hole 2c is provided separately from the through hole 2b in the vicinity of the other one of the pair of the edges 1c. Thus, since the amount of expansion and contraction of the reflective sheet 3 due to heat is relatively greater in the Y direction, providing the through hole 2b and the through hole 2c in the vicinity of the pair of the edges 1c in the Y direction is particularly effective in avoiding contact between the inner edge portions 3b of the opening 3a and the LED 1.

In the first embodiment, the backlight unit 10 is configured such that each of the through hole 2b and the through hole 2c is provided in the form of a slit extending along the direction in which the pair of the edges 1c of the LED 1 extends, as described above. Thus, the inner edge portions 3b of the opening 3a inserted into the through holes 2b and 2c can be provided to extend along the above-mentioned pair of the edges 1c. As a result, the area of the reflective sheet 3 provided in the vicinity of the LED 1 can be easily enlarged, and thus the formation of an area where the surface 2a of the substrate 2 is exposed in the vicinity of the LED 1 can be minimized as much as possible.

In the first embodiment, as described above, the backlight unit 10 is configured such that the widths W1 and W2 of the through holes 2b and 2c in the Y direction are greater than twice the thickness t of the reflective sheet 3. Thus, compared to the case where the widths W1 and W2 of the through holes 2b and 2c in the Y direction are equal to or less than twice the thickness t of the reflective sheet 3, even when part of the through holes 2b and 2c is covered by the LED 1 due to variations in manufacturing (e.g., mounting variations of the LED 1, variations in the mounting position of the substrate 2, variations in the position of the through holes 2b and 2c, etc.), the inner edge portions 3b of the opening 3a can be easily inserted into the through holes 2b and 2c.

In the first embodiment, as described above, the backlight unit 10 is configured such that the reflective sheet 3 expands and contracts in the direction along the side surfaces 1e of the LED 1 extending in the perpendicular direction by having the inner edge portions 3b of the opening 3a inserted into the through holes 2b and 2c. Thus, the inner edge portions 3b of the opening 3a can be suppressed from expanding towards the side surfaces 1e of the LED 1, and thus contact between the inner edge portions 3b of the opening 3a and the LED 1 can be easily avoided.

In the first embodiment, as described above, the backlight unit 10 is configured such that the corners 2g and 2i of the opening ends 2f and 2h of the through holes 2b and 2c in which the inner edge portions 3b of the opening 3a are inserted, respectively, are chamfered. Thus, the reflective sheet 3 can be suppressed from being damaged by the corners 2g and 2i of the opening ends 2f and 2h of the through holes 2b and 2c.

In the first embodiment, the backlight unit 10 is configured such that the lengths L1 and L2 of the reflective sheet 3 inserted in the through holes 2b and 2c are greater than the thickness t of the reflective sheet 3, as described above. Thus, compared to the case where the lengths L1 and L2 of the reflective sheet 3 inserted in the through holes 2b and 2c are equal to or less than the thickness t of the reflective sheet 3, the reflective sheet 3 can be suppressed from being pulled out of the through holes 2b and 2c.

In the first embodiment, as described above, the liquid crystal television device 100 is configured such that the through holes 2b and 2c are provided such that the inner edge portions 3b of the opening 3a are inserted thereto so as to avoid contact between the inner edge portions 3b of the reflective sheet 3 in the expanded state by heat and the LED 1. Thus, by providing the through holes 2b and 2c, contact between the inner edge portions 3b of the opening 3a and the LED 1 can be avoided when the reflective sheet 3 is expanded by heat. As a result, it is possible to suppress the damage to (and wrinkling of) the inner edge portions 3b of the opening 3a due to further expanding of the reflective sheet 3 by heat (towards the LED 1) in a state where the inner edge portions 3b of the opening 3a are in contact with the LED 1. Furthermore, by providing the through holes 2b and 2c in the vicinity of the LED 1, even when the inner edge portions 3b of the opening 3a is arranged so that the inner edge portions 3b of the opening 3a extend to the vicinity of the LED 1 as viewed from the perpendicular direction, the through holes 2b and 2c provided in the vicinity of the LED 1 can avoid contact between the inner edge portions 3b of the opening 3a and the LED 1. As a result, exposure of the surface 2a of the substrate 2 in the vicinity of the LED 1 can be suppressed as much as possible, and thus the liquid crystal television device 100 can be provided by which a decrease in the reflection efficiency of the light in the liquid crystal television device 100 can be suppressed while suppressing the damage to the reflective sheet 3 (the inner edge portions 3b of the opening 3a).

Second Embodiment

Referring now to FIG. 7 and FIGS. 9 to 11, the configuration of a backlight unit 20 of a liquid crystal television device 200 according to a second embodiment will be described. In view of the similarity between the first and second embodiments, the parts of the second embodiment that are identical to or similar to the parts of the first embodiment will be given the same reference numerals as the parts of the first embodiment. Moreover, the descriptions of the parts of the second embodiment that are identical to or similar to the parts of the first embodiment may be omitted for the sake of brevity. In the second embodiment, unlike the first embodiment, an example of a configuration in which a recess 12b is provided in a substrate 12 will be described. The backlight unit 20 and the liquid crystal television device 200 are examples of the "lighting device" and the "display device" of the present disclosure, respectively. The recess 12b is an example of the "substrate side opening" of the present disclosure.

Figure 9:
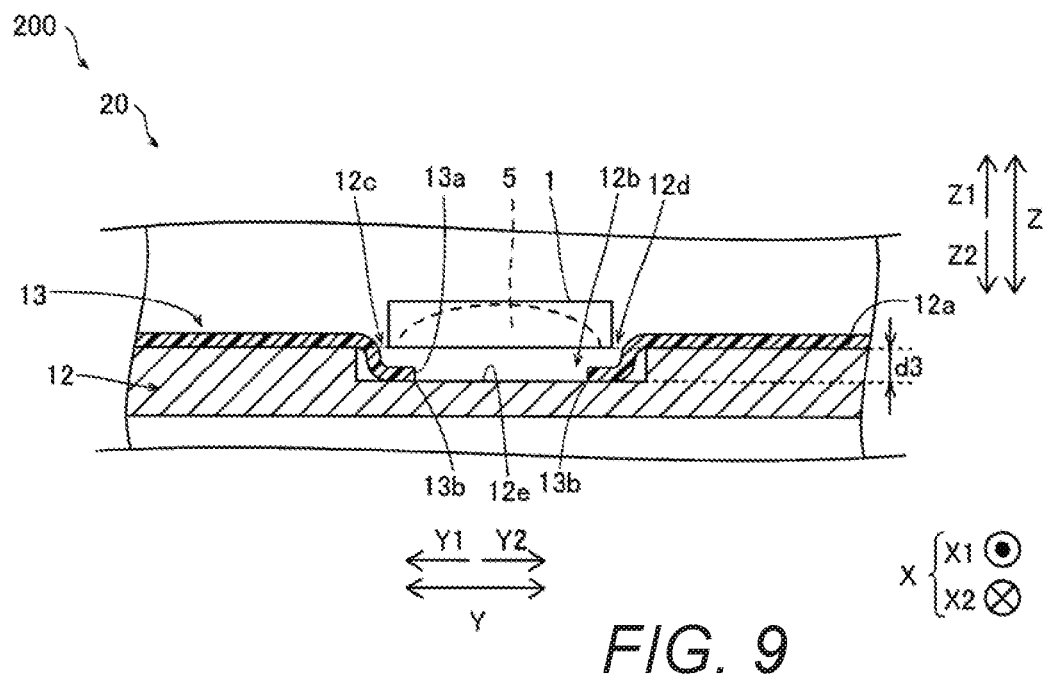
FIG. 9 is an enlarged cross-sectional view of the vicinity of an LED of a backlight unit in accordance with a second embodiment.

As shown in FIG. 9, the liquid crystal television device 200 (the backlight unit 20) has the substrate 12 and a reflective sheet 13. The reflective sheet 13 is provided to cover a surface 12a of the substrate 12.

The substrate 12 includes the recess 12b provided in the vicinity of the LED 1. Specifically, the recess 12b is provided below the LED 1 (on the Z2 direction side). The recess 12b is provided to be depressed from the surface 12a of the substrate 12. The recess 12b may be formed on the substrate 12 itself, or it may be formed only by a resist layer, which is not shown, comprising the surface 12a of the substrate 12. An opening end of the recess 12b may also be provided with a chamfered corner as in the first embodiment above. Similar to the first embodiment, the backlight unit 20 includes multiple LEDs 1, and thus the substrate 12 also includes multiple recesses 12b at locations corresponding to the multiple LEDs 1. However, the configuration of each recess 12b is the same with each other, and thus the configuration of one recess 12b will be described below for the sake of brevity.

The length L3 (see FIG. 10) of the LED 1 in the X direction is longer than the length L4 (see FIG. 11) of the recess 12b in the X direction. Thereby, the LED 1 is fixed to the surface 12a of the substrate 12 without being fitted into the recess 12b. The length L5 (see FIG. 10) of the LED 1 in the Y direction is shorter than the length L6 (see FIG. 11) of the recess 12b in the X direction. Thereby, a pair of exposed portions 12c and 12d, which will be described below, is formed in the recess 12b as viewed from the perpendicular direction (the Z1 direction side). Also, in the illustrated embodiment, as shown in FIG. 9, the LED 1 is disposed entirely outside the recess 12b, for example.

Figure 10:
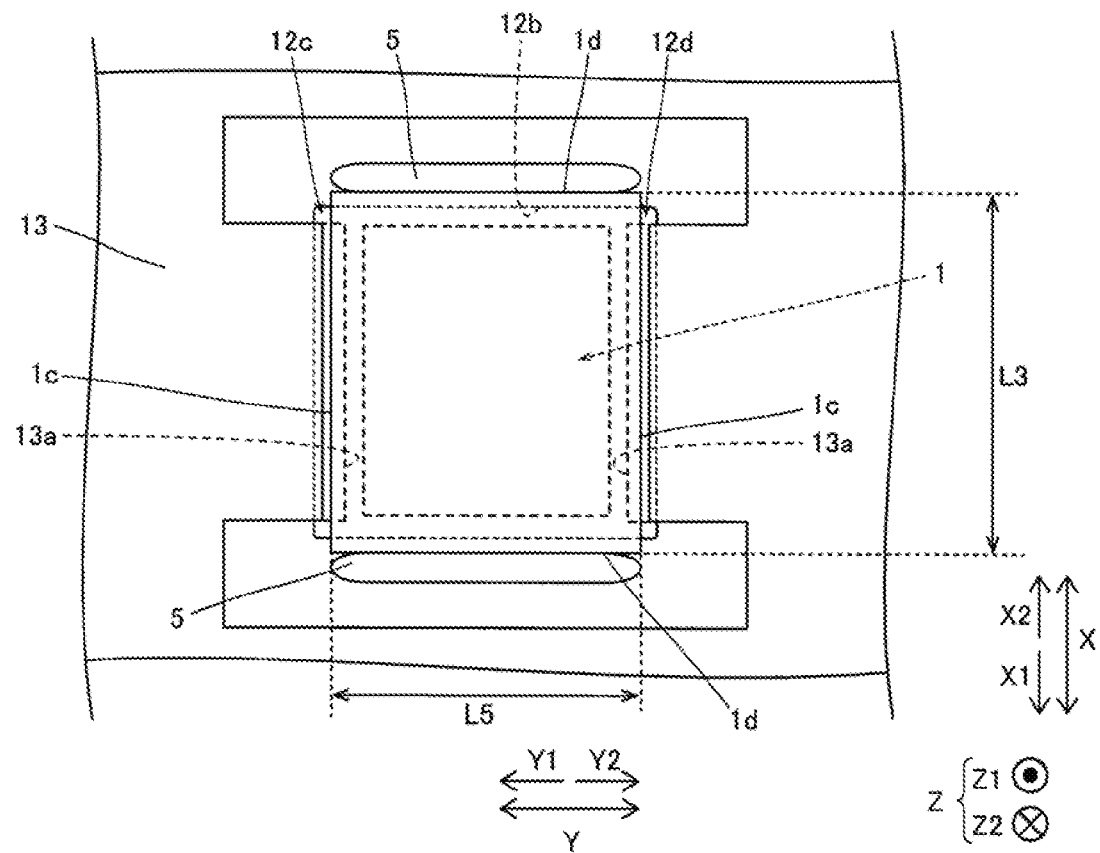
FIG. 10 is an enlarged plan view of the vicinity of the LED of the backlight unit in accordance with the second embodiment.

As shown in FIG. 10, the recess 12b is provided such that a part of it overlaps with the LED 1 and the other part is exposed from the LED 1 as viewed from the perpendicular direction (the Z1 direction side). Thus, the recess 12 is provided below the LED 1 to only partially overlaps with the LED 1 as viewed from the perpendicular direction.

Specifically, the recess 12b has the exposed portions 12c and 12d exposed from the LED 1 as viewed from the perpendicular direction (the Z1 direction side). The exposed portion 12c is provided in the vicinity of one of the pair of the edges 1c of the LED 1 in the Y direction (the Y1 direction side) as viewed from the perpendicular direction. Furthermore, the exposed portion 12d is provided in the vicinity of the other one of the pair of the edges 1c (the Y2 direction side) as viewed from the perpendicular direction. More specifically, each of the exposed portion 12c and the exposed portion 12d is provided in the form of a slit extending along the pair of the edges 1c. The exposed portions 12c and 12d are provided to extend from the vicinity of one of the edges 1d of the LED 1 in the X direction to the vicinity of the other one of the edges 1d of the LED 1.

Here, in the second embodiment, as shown in FIG. 9, the recess 12b is provided such that inner edge portions 13b of an opening 13a provided in the reflective sheet 13 are inserted thereto so as to avoid contact between the inner edge portions 13b of the reflective sheet 13 in an expanded state by heat and the LED 1. The opening 13a is an example of the "reflective sheet side opening" of the present disclosure. In the illustrated embodiment, as shown in FIG. 9, the reflective sheet 13 includes the opening 13a at a location corresponding to the LED 1. Similar to the first embodiment, the backlight unit 20 includes multiple LEDs 1, and thus the reflective sheet 13 also includes multiple openings 13a at locations corresponding to the multiple LEDs 1. However, the configuration of each opening 13a is the same with each other, and thus the configuration of one opening 13a will be described below for the sake of brevity.

Specifically, the inner edge portions 13b of the opening 13a are inserted into the interior of the recess 12b from the exposed portions 12c and 12d of the recess 12b, respectively, which are exposed from the LED 1 as viewed from the perpendicular direction (the Z1 direction side). The inner edge portions 13b of the opening 13a are also provided to extend along a bottom surface 12e of the recess 12b. More specifically, as shown in FIG. 9, the lengths (shown without a reference character) of the inner edge portions 13b of the reflective sheet 13 inserted from the exposed portions 12c and 12d into the interior of the recess 12b are greater than the depth d3 of the recess 12b. Thereby, the reflective sheet 13 inserted into the interior of the recess 12b is bent towards the LED 1 side in contact with the bottom surface 12e of the recess 12b. That is, the inner edge portions 13b of the opening 13a are provided to extend along the bottom surface 12e of the recess 12b while contacting the bottom surface 12e of the recess 12b. In this case, the inner edge portions 13b each includes a base part that extends in the Z direction and an end part that extends in the Y direction. The base part is connected to a main portion of the reflective sheet 3 that is disposed on the surface 2a of the substrate 2 via a first bent part, while the end part is connected to the base part via a second bent part. In the illustrated embodiment, as shown in FIG. 0.10, the end parts of the inner edge portions 13b are at least partially disposed directly below the LED 1 so as to overlap with the LED 1 as viewed from the perpendicular direction. Thus, in the illustrated embodiment, the total length of the base part (along the Z direction) and the end part (along the Y direction) of each of the inner edge portions 13b is greater than the depth d3 of the recess 12b. Alternatively, the inner edge portions 13b of the opening 13a and the bottom surface 12e of the recess 12b can be configured so as not to be in contact with each other. The depth d3 of the recess 12b is greater than the thickness t of the reflective sheet 13 (see FIG. 7).

Figure 11:
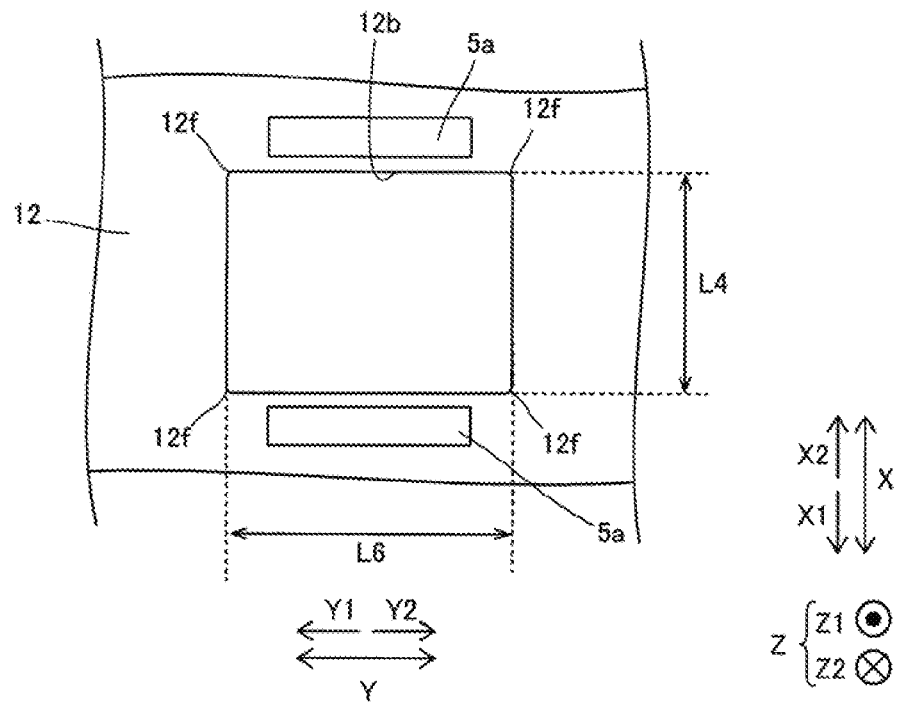
FIG. 11 is an enlarged plan view of the vicinity of a recess of a substrate of the backlight unit in accordance with the second embodiment.

As shown in FIG. 11, each of four corners 12f of the recess 12b has an R shape or a rounded shape. The recess 12b may have a rectangular shape with four corners at right angles, or may have an oval or rhombus shape as viewed from the perpendicular direction (the Z1 direction side).

The other configurations of the second embodiment are the same as the first embodiment above.

Effect of the Second Embodiment

In the second embodiment, similarly to the first embodiment above, by providing the recess 12b, contact between the inner edge portions 13b of the opening 13a and the LED 1 can be avoided when the reflective sheet 13 is expanded by heat. As a result, it is possible to suppress the damage to (and wrinkling of) the inner edge portions 13b of the opening 13a due to further expanding of the reflective sheet 13 by heat (towards the LED 1) in a state where the inner edge portions 13b of the opening 13a is in contact with the LED 1. Furthermore, by providing the recess 12b in the vicinity of the LED 1, the recess 12b provided in the vicinity of the LED 1 can avoid contact between the inner edge portions 13b of the opening 13a and the LED 1 even when the inner edge portions 13b of the opening 13a are arranged to extend to the vicinity of the LED 1 as viewed from the perpendicular direction. As a result, exposure of the surface 12a of the substrate 12 in the vicinity of the LED 1 can be suppressed as much as possible, and thus a decrease in the reflection efficiency of the light in the backlight unit 20 (the liquid crystal television device 200) can be suppressed while suppressing the damage to the reflective sheet 13 (the inner edge portions 13b of the opening 13a).

In the second embodiment, as described above, the backlight unit 20 is configured such that the inner edge portions 13b of the opening 13a are inserted into the recess 12b. Thus, by inserting the inner edge portions 13b of the opening 13a into the recess 12b, contact between the inner edge portions 13b of the opening 13a and the LED 1 can be easily avoided.

In the second embodiment, as described above, the backlight unit 20 is configured such that the inner edge portions 13b of the opening 13a are inserted into the interior of the recess 12b from the exposed portions 12c and 12d of the recess 12b, which are exposed from the LED 1 as viewed from the perpendicular direction, as well as extending along the bottom surface 12e of the recess 12b. Thus, by providing the inner edge portions 13b of the opening 13a to extend along the bottom surface 12e of the recess 12b, the inner edge portions 13b of the opening 13a can be suppressed from moving (expanding) towards the LED 1, and thus contact between the inner edge portions 13b of the opening 13a and the LED 1 can be easily avoided. Furthermore, by providing the recess 12b in the substrate 12 so that the exposed portion 12c and 12d are formed, the inner edge portions 13b of the opening 13a can be easily inserted into the recess 12b through the exposed portions 12c and 12d.

The other effects of the second embodiment are the same as in the first embodiment.

Third Embodiment

Figure 12:
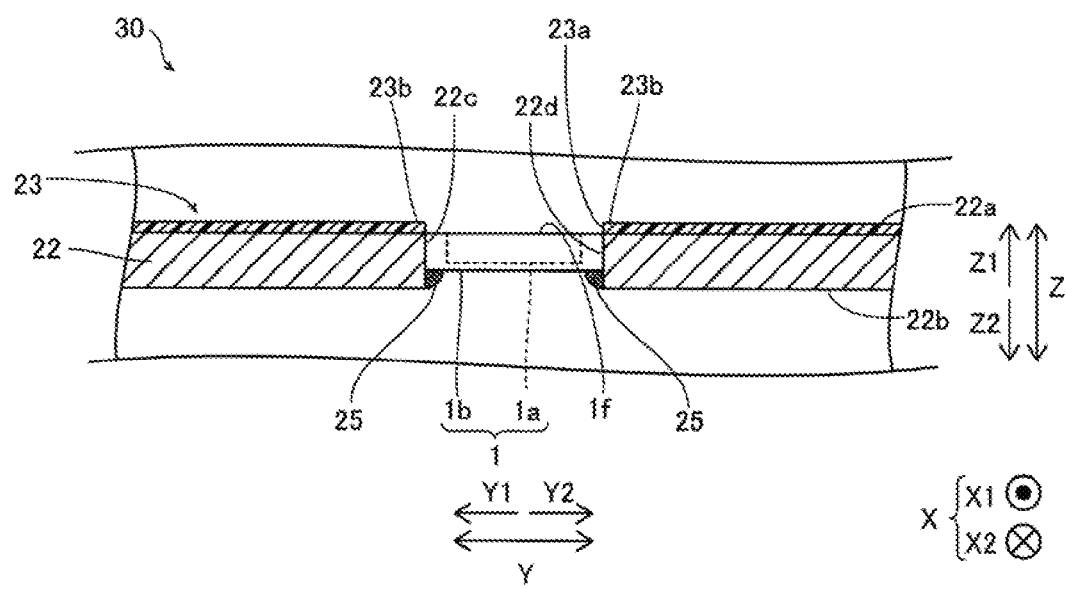
FIG. 12 is an enlarged cross-sectional view of the vicinity of an LED of a backlight unit in accordance with a third embodiment.
Figure 13:
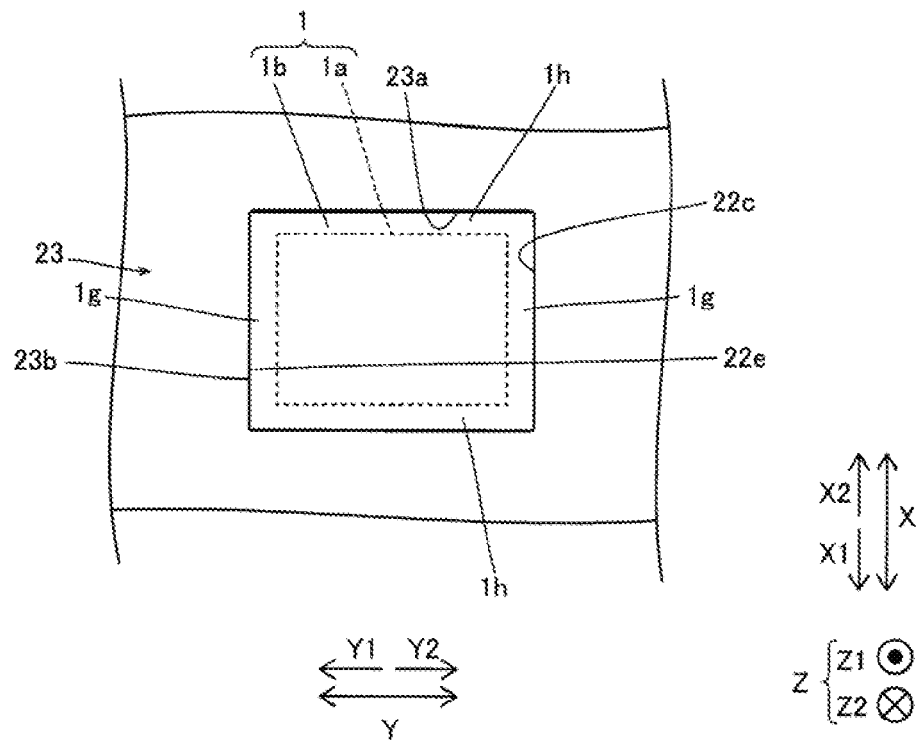
FIG. 13 is an enlarged plan view of the vicinity of the LED the backlight unit in accordance with the third embodiment.
Figure 14:
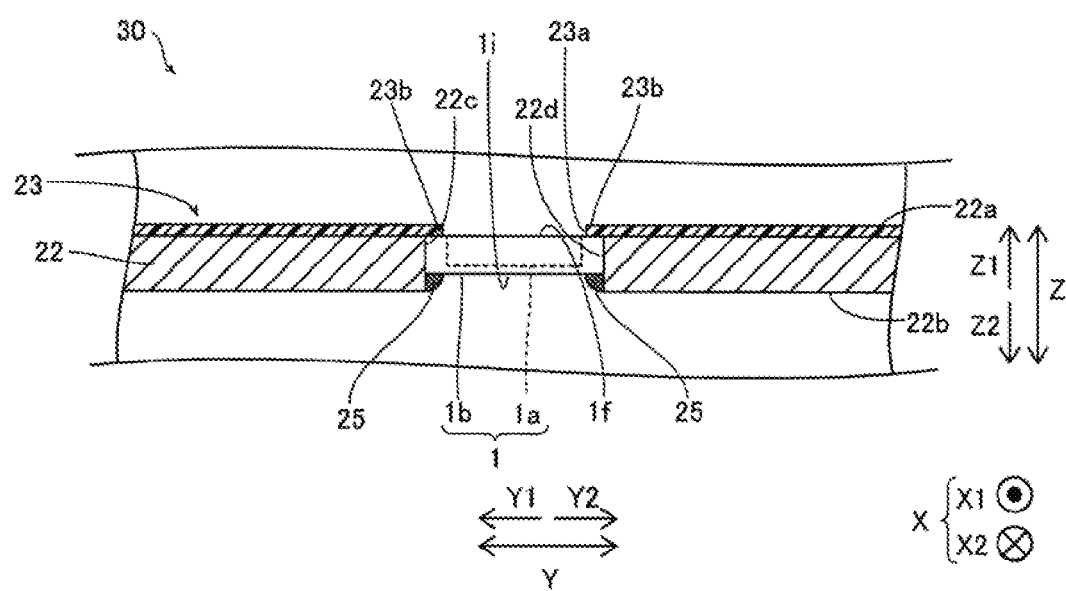
FIG. 14 is an enlarged cross-sectional view of the vicinity of the LED in a state where a reflective sheet of the backlight unit is expanded in accordance with the third embodiment.

Referring now to FIGS. 12 to 14, the configuration of a backlight unit 30 of a liquid crystal television deice 300 according to a third embodiment will be described. In view of the similarity between the first to third embodiments, the parts of the third embodiment that are identical to or similar to the parts of the first and second embodiments will be given the same reference numerals as the parts of the first and second embodiment. Moreover, the descriptions of the parts of the third embodiment that are identical to or similar to the parts of the first and second embodiments may be omitted for the sake of brevity. In the third embodiment, unlike the first and second embodiments, a through hole 22c is provided in a substrate 22. The backlight unit 30 and the liquid crystal television device 300 are examples of the "lighting device" and the "display device" of the present disclosure, respectively. The through hole 22c is an example of the "substrate side opening" and the "second through hole" of the present disclosure.

As shown in FIG. 12, the liquid crystal television device 300 (the backlight unit 30) has the substrate 22 and a reflective sheet 23. The reflective sheet 23 is provided to cover a surface 22a of the substrate 22. The substrate 22 includes a back surface 22b provided on the opposite side of the surface 22a.

The substrate 22 is provided with the through hole 22c that penetrates the substrate 22 along the perpendicular direction (the Z direction). Specifically, the through hole 22c is provided to extend in the perpendicular direction (the Z direction). In the illustrated embodiment, as shown in FIGS. 12 to 14, the substrate 22 includes the through hole 22c at a location corresponding to the LED 1. Similar to the first embodiment, the backlight unit 30 includes multiple LEDs 1, and thus the substrate 22 also includes multiple through holes 22c at locations corresponding to the multiple LEDs 1.

However, the configuration of each through hole 22c is the same with each other, and thus the configuration of one through hole 22c will be described below for the sake of brevity.

Here, in the third embodiment, the LED 1 is fixed to the through hole 22c. Specifically, the LED 1 is fixed to an inner peripheral surface 22d of the through hole 22c at a position where it does not protrude from the through hole 22c to the surface 22a side of the substrate 22. The LED 1 is provided to emit light through the through hole 22c. More specifically, the LED 1 has the same shape (rectangular shape, see FIG. 13) as the through hole 22c as viewed from the perpendicular direction (the Z1 direction side). Thereby, the LED 1 is provided to fit into the through hole 22c. Thus, in the illustrated embodiment, the LED 1 is entirely disposed within the through hole 22c between the surface 22a and the back surface 22b in the Z direction.

The LED 1 is disposed at the inner peripheral surface 22d of the through hole 22c at a position closer to the reflective sheet 23 side (the Z1 direction side). Specifically, the LED 1 is provided such that an upper surface if of the LED 1 on the reflective sheet 23 side (the Z1 directional side) is flush with the surface 22a of the substrate 22.

As shown in FIG. 13, the reflective sheet 23 includes an opening 23a. Specifically, as shown in FIG. 13, the reflective sheet 23 includes the opening 23a at a location corresponding to the LED 1. Similar to the first embodiment, the backlight unit 30 includes multiple LEDs 1, and thus the reflective sheet 23 also includes multiple openings 23a at locations corresponding to the multiple LEDs 1. However, the configuration of each opening 23a is the same with each other, and thus the configuration of one opening 23a will be described below for the sake of brevity. The opening 23a has a rectangular shape as viewed from the perpendicular direction. The opening 23a is an example of the "reflective sheet side opening" of the present disclosure.

The through hole 22c of the substrate 22 has substantially the same shape and size as the opening 23a in a state where the reflective sheet 23 is not expanded by heat. For example, the through hole 22c of the substrate 22 has the same shape and size as the opening 23a when the liquid crystal television device 300 (the backlight unit 30) is in a non-operating state. Specifically, an inner edge portion 23b (an inner peripheral edge portion) of the opening 23a is provided to overlap an edge portion 22e of the through hole 22c of the substrate 22 in a state in which the reflective sheet 23 is not expanded or contracted by heat.

Unlike the first and second embodiments above, the inner edge portion 23b of the opening 23a and the surface 22a of the substrate 22 are bonded by an adhesive not shown, and thus the amount of expansion and contraction of the reflective sheet 23 (the inner edge portion 23b) itself can be relatively suppressed.

Figure 15:
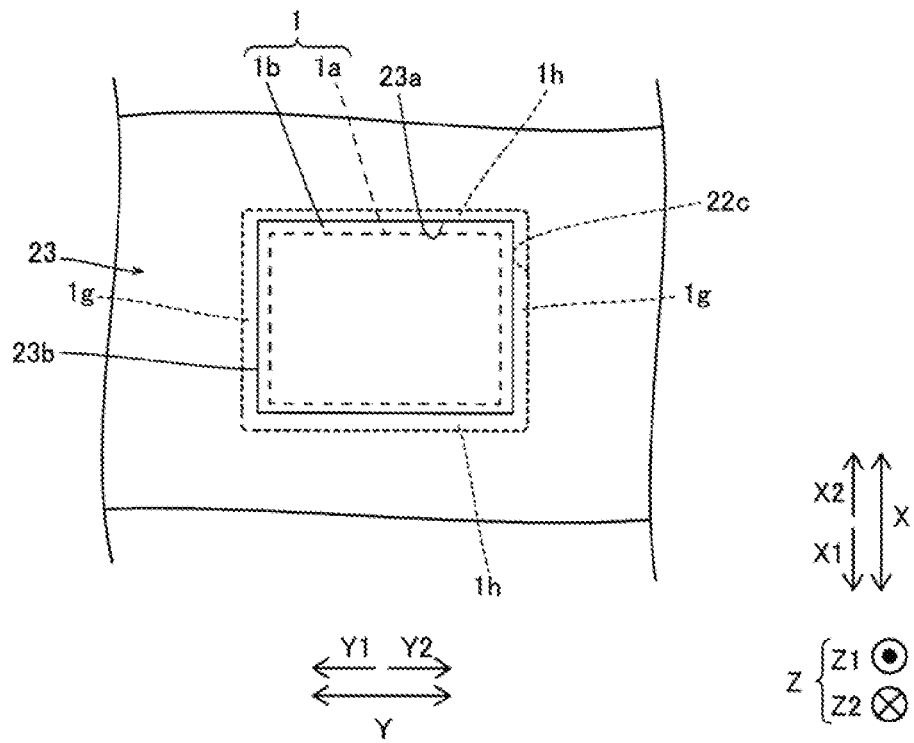
FIG. 15 is an enlarged plan view of the vicinity of the LED in the state where the reflective sheet of the backlight unit is expanded in accordance with the third embodiment.

Here, in the third embodiment, as shown in FIGS. 14 and 15, as the reflective sheet 23 expands along the surface 22a of the substrate 22, the inner edge portion 23b of the opening 23a does not overlap with the light-emitting region of the phosphor 1a, but overlaps with an end portion or a periphery of the package 1b (end portions 1g and 1h, which will be discussed below) as viewed from the perpendicular direction (the Z1 direction side). Specifically, as the reflective sheet 23 expands along the surface 22a of the substrate 22, the inner edge portion 23b of the opening 23a overlaps with each of the end portions 1g (see FIG. 15) of the package 1b on both sides in the Y direction and the end portions 1h (see FIG. 15) of the package 1b on both sides in the X direction as viewed from the perpendicular direction. On the other hand, even when the reflective sheet 23 is expanded, the inner edge portion 23b of the opening 23a does not overlap with at least the phosphor 1a as viewed from the perpendicular direction (the Z1 direction side).

Furthermore, as described above, the inner edge portion 23b of the opening 23a overlaps with the end portions 1g and 1h of the package 1b as viewed from the perpendicular direction (the Z1 direction side), but unlike the case where the inner edge portion 23b rides up on the LED 1, the inner edge portion 23b does not extend diagonally relative to the surface 22a of the substrate 22 (does not extend to intersect with the surface 22a). In particular, as shown in FIGS. 13 and 14, the upper surface of the LED 1 is disposed below (in the Z2 direction) relative to a back surface of the reflective sheet 23 that faces with the surface 22a of the substrate while the reflective sheet 23 is not expanded and is expanded. Thus, the expansion of the reflective sheet 23 is not interfered by the LED 1, and therefore the reflective sheet 23 is prevented from warping even when the reflective sheet 23 is expanded such that the inner edge portion 23b overlaps with the end portions 1g and 1h of the package 1b as viewed from the perpendicular direction, for example. As a result, more of the light irradiated onto the inner edge portion 23b from the back surface 22b side (the Z2 direction side) of the substrate 22 can be reflected to the back surface 22b side (the Z2 direction side). Thereby, the light from the LED 1 can be suppressed from being reflected by the inner edge portion 23b (in a diagonal direction with respect to the surface 22a) and being irradiated in an area other than a desired irradiation area in the display 101. As a result, it is possible to suppress a decrease in contrast in the display 101.

Furthermore, as shown in FIG. 14, the liquid crystal television device 300 (the backlight unit 30) has a soldered portion 25 that fixes the LED 1 to the substrate 22 from the back surface 22b side of the substrate 22.

Here, in the third embodiment, the soldered portion 25 is provided so as to bond the inner peripheral surface 22d of the through hole 22c and the LED 1. Specifically, the soldered portion 25 is provided so as to bond the inner peripheral surface 22d of the through hole 22c and a bottom surface 1i of the LED 1. Thus, by being covered by the LED 1, the soldered portion 25 is provided so as not to be visible (exposed) as viewed from the perpendicular direction (the Z1 direction side). The bottom surface 1i of the LED 1 is the opposite side of the LED 1 from the top surface 1f of the LED 1.

The other configurations of the third embodiment are the same as the first embodiment above.

Effect of the Third Embodiment

In the third embodiment, similarly to the first embodiment above, by providing the through hole 22c, contact between the inner edge portion 23b of the opening 23a and the LED 1 can be avoided when the reflective sheet 23 is expanded by heat. As a result, it is possible to suppress the damage to (and wrinkling of) the inner edge portion 23b of the opening 23a due to further expanding of the reflective sheet 23 by heat (towards the LED 1) in a state where the inner edge portion 23b of the opening 23a is in contact with the LED 1. Furthermore, by providing the through hole 22c in the vicinity of the LED 1, the through hole 22c provided in the vicinity of the opening 23a can avoid contact between the inner edge portion 23b of the opening 23a and the LED 1 even when the inner edge portion 23b of the opening 23a is arranged to extend to the vicinity of the LED 1 as viewed from the perpendicular direction. As a result, exposure of the surface 22a of the substrate 22 in the vicinity of the LED 1 can be suppressed as much as possible, and thus a decrease in the reflection efficiency of the light in the backlight unit 30 (the liquid crystal television device 300) can be suppressed while suppressing the damage to the reflective sheet 23 (the inner edge portion 23b of the opening 23a).

In the third embodiment, as described above, the LED 1 is fixed to the inner peripheral surface 22d of the through hole 22c at a position where it does not protrude from the through hole 22c to the surface 22a side of the substrate 22. Furthermore, the backlight unit 30 is configured such that the LED 1 emits the light through the through hole 22c. Thereby, the LED 1 does not protrude from the through hole 22c to the surface 22a side of the substrate 22, and thus contact between the LED 1 and the inner edge portion 23b of the opening 23a can be easily avoided when the reflective sheet 23 expands and contracts along the surface 22a of the substrate 22. Furthermore, even if the LED 1 is provided on the back surface 22b side relative to the surface 22a of the substrate 22, the light is emitted through the through hole 22c, and thus a decrease in the luminous efficiency of the LED 1 can be suppressed.

In the third embodiment, as described above, the backlight unit 30 is configured such that as the reflective sheet 23 expands along the surface 22a of the substrate 22, the inner edge portion 23b of the opening 23a does not overlap with the light-emitting region of the phosphor 1a, but overlaps with the end portions 1g and 1h of the package 1b as viewed from the perpendicular direction. Thus, a decrease in the luminous efficiency from the LED 1 (the light-emitting region) can be suppressed while suppressing the formation of an area where the surface 22a of the substrate 22 is exposed when the reflective sheet 23 is expanded.

In the third embodiment, as described above, the backlight unit 30 is configured such that the LED 1 is disposed at the inner peripheral surface 22d of the through hole 22c at a position closer to the reflective sheet 23 side. Thus, the distance between the LED 1 and the inner edge portion 23b of the opening 23a can be made relatively small. As a result, when the light is emitted radially from the LED 1, the spread (width) of the light as it passes through the opening 23a can be made relatively small. Thus, the light from the LED 1 can be suppressed from being blocked by the inner edge portion 23b of the opening 23a when the end portions 1g and 1h of the package 1b and the inner edge portion 23b of the opening 23a overlap with each other as viewed from the perpendicular direction.

In the third embodiment, as described above, the backlight unit 30 is provided with the soldered portion 25 that fixes the LED 1 to the substrate 22 from the back surface 22b side of the substrate 22. Furthermore, the backlight unit 30 is configured such that the soldered portion 25 bonds the LED 1 to the inner peripheral surface 22d of the through hole 22c. Thus, the soldered portion 25 can be suppressed from being exposed as viewed from the surface 22a side of the substrate 22. As a result, the reflected light from the surface 22a side of the substrate 22 can be suppressed from being irradiated onto the soldered portion 25, and thus light absorption by the soldered portion 25 can be suppressed. Thus, a decrease in the luminous efficiency of the LED 1 can be suppressed.

The other effects of the third embodiment are the same as in the first embodiment.

Modification Examples

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first embodiment above, an example is shown in which the through holes 2b and 2c (the substrate side opening) overlap with the LED 1 (the light source) as viewed from the perpendicular direction, however, the present invention is not limited to this. For example, the through holes 2b and 2c (the substrate side openings) may be adjacent to (next to) the LED 1 (the light source) without overlapping with the LED 1 (the light source) as viewed from the perpendicular direction.

Figure 16:
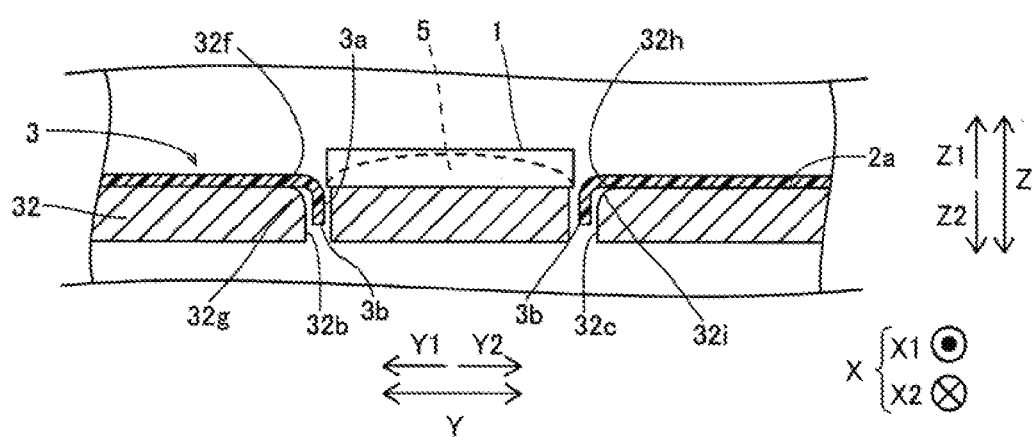
FIG. 16 is an enlarged cross-sectional view of the vicinity of the LED of the backlight unit in accordance with a first modification example regarding to the first embodiment.

In the first embodiment above, an example is shown in which the corners 2g and 2i of the opening ends 2f and 2h (the first opening end) of the through holes 2b and 2c (the substrate side opening) are C-chamfered, however, the present invention is not limited to this. The corners 2g and 2i may be subject to a chamfering process other than C-chamfering. Specifically, as shown in FIG. 16, the substrate 32 is provided with a through hole 32b having a corner 32g where an opening end 32f is R-chamfered and a through hole 32c having a corner 32i where an opening end 32h is R-chamfered. Furthermore, one of the two corners may be C-chamfered and the other may be R-chamfered. Here, the through hole 32b is an example of the "substrate side opening (or additional substrate side opening)," the "first through hole," and the "first opening (or second opening)" of the present disclosure. Also, the through hole 32c is an example of the "additional substrate side opening (or substrate side opening)," the "first through hole," and the "second opening (or first opening)" of the present disclosure.

In the first embodiment above, an example is shown in which the through holes 2b and 2c (the substrate side opening) are provided to extend in the perpendicular direction (the Z direction), however, the present invention is not limited to this. Through holes with different shape may be provided in the substrate.

Figure 17:
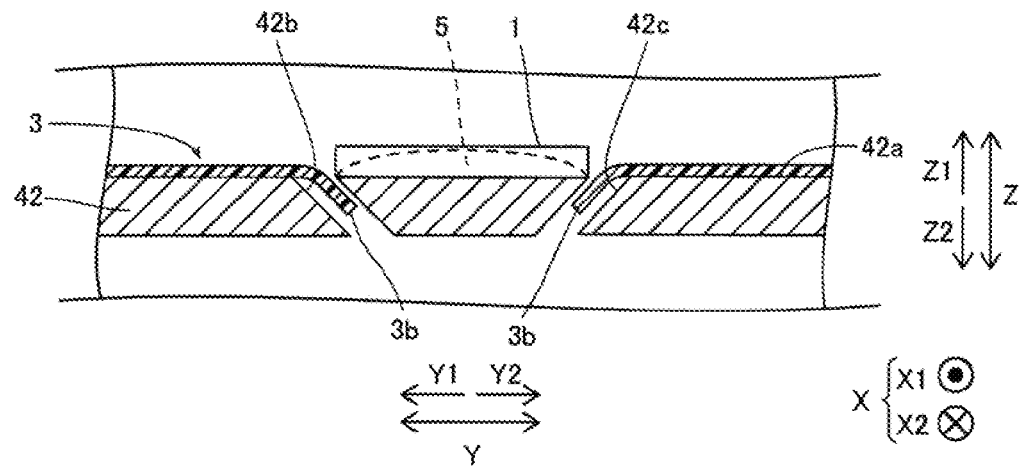
FIG. 17 is enlarged cross-sectional view of the vicinity of the LED of the backlight unit in accordance with a second modification example regarding to the first embodiment.

Specifically, as shown in FIG. 17, a substrate 42 includes a through hole 42b and a through hole 42c, which are provided to penetrate the substrate 42 at an angle relative to a surface 42a of the substrate 42. Here, the through hole 42b is an example of the "substrate side opening (or additional substrate side opening)," the "first through hole," and the "first opening (or second opening)" of the present disclosure. The through hole 42c is an example of the "additional substrate side opening (or substrate side opening)," the "first through hole," and the "second opening (or first opening)" of the present disclosure. In this case, the through holes 42b and 42c at least partially overlap with the LED 1 as viewed from the perpendicular direction. Furthermore, as shown in FIG. 17, the inner edge portions 3b of the reflective sheet 3 are inserted into the through holes 42b and 42c, respectively. As shown in FIG. 17, the inner edge portions 3b of the reflective sheet 3 are at least partially disposed directly below the LED 1 such that the inner edge portions 3b overlap with the LED 1 as viewed from the perpendicular direction.

Figure 18:
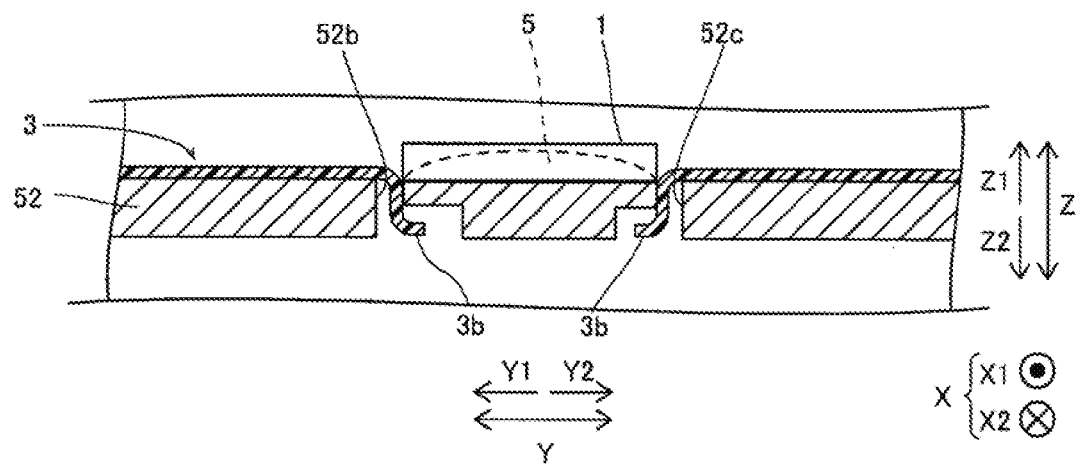
FIG. 18 is an enlarged cross-sectional view of the vicinity of the LED of the backlight unit in accordance with a third modification example regarding to the first embodiment.

Furthermore, as shown in FIG. 18, a substrate 52 includes a through hole 52b and a through hole 52c that penetrate the substrate 52 and have an L-shaped cross-sectional shape. The through hole 52b is an example of the "substrate side opening (or additional substrate side opening)," the "first through hole," and the "first opening (or second opening)" of the present disclosure. The through hole 52c is an example of the "additional substrate side opening (or substrate side opening)," the "first through hole," and the "second opening (first opening)" of the present disclosure. In this case, the through holes 52b and 52c at least partially overlap with the LED 1 as viewed from the perpendicular direction. Furthermore, as shown in FIG. 18, the inner edge portions 3b of the reflective sheet 3 are inserted into the through holes 52b and 52c, respectively. As shown in FIG. 18, the inner edge portions 3b of the reflective sheet 3 are at least partially disposed directly below the LED 1 such that the inner edge portions 3b (end parts of the inner edge portions 3b) overlap with the LED 1 as viewed from the perpendicular direction.

In the first embodiment above, an example is shown in which of the through holes 2b and 2c (the substrate side opening) are provided in the substrate 2, however, the present invention is not limited to this. Openings other than the through hole may be provided in the substrate.

Figure 19:
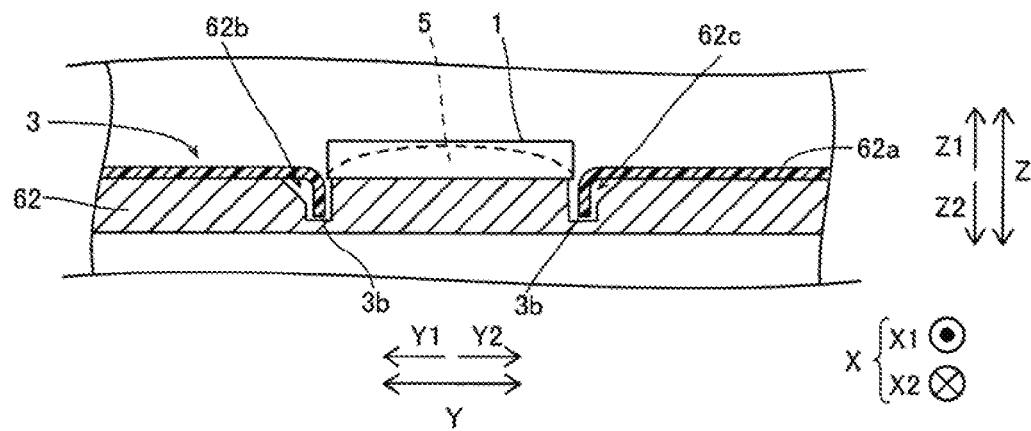
FIG. 19 is an enlarged cross-sectional view of the vicinity of the LED of the backlight unit in accordance with a fourth modification example regarding to the first embodiment.

Specifically, as shown in FIG. 19, a substrate 62 includes a recess 62b and a recess 62c that are depressed from a surface 62a of the substrate 62. The recess 62b and the recess 62c are an example of the "substrate side opening" and the "additional substrate side opening" of the present disclosure. In this case, as shown in FIG. 19, the inner edge portions 3b of the reflective sheet 3 are inserted into the recesses 62b and 62c, respectively. The recesses 62b and 62c do not penetrate the substrate 62 and each have a bottom.

Furthermore, the shapes of the two openings in the substrate may be different from each other. Specifically, one of the openings can be selected from the through holes 2b, 32b, 42b and 52b and the recess 62b, while the other one of the openings can be selected from the through holes 2c, 32c, 42c and 52c and the recess 62c. For example, one of the openings may be the through hole 32b (or 32c) shown in FIG. 16 and the other one of the openings may be the through hole 42c (or 42b) shown in FIG. 17.

Furthermore, in the first embodiment, the substrate 2 includes two through holes 2b and 2c to which the inner edge portions 3b of the reflective sheet 3 are inserted. However, the substrate 2 can include only one through hole for each LED 1, or more than two through holes for each LED 1. Furthermore, in this case, the reflective sheet 3 can include only one inner edge portion that is inserted into the one through hole, or more than two inner edge portions that are inserted into the more than two through holes, respectively.

Furthermore, in the second embodiment, the substrate 2 includes two exposed portions 12c and 12d from which the inner edge portions 13b of the reflective sheet 13 are inserted into the recess 12b. However, the substrate 2 can include only one exposed portion for each LED 1, or more than two exposed portions for each LED 1. Furthermore, in this case, the reflective sheet 3 can include only one inner edge portion that is inserted into the recess 12b through the one exposed portion, or more than two inner edge portions that are inserted into the recess 12b through the more than two exposed portions, respectively.

Furthermore, in the third embodiment described above, an example is shown in which the LED 1 (the light source) is disposed at the inner peripheral surface 22d of the through hole 22c at a position closer to the reflective sheet 23 side, however, the present invention is not limited to this. The LED 1 (the light source) can be disposed at the inner peripheral surface 22d of the through hole 22c at a different position from the position closer to the reflective sheet 23 side.

Figure 20:
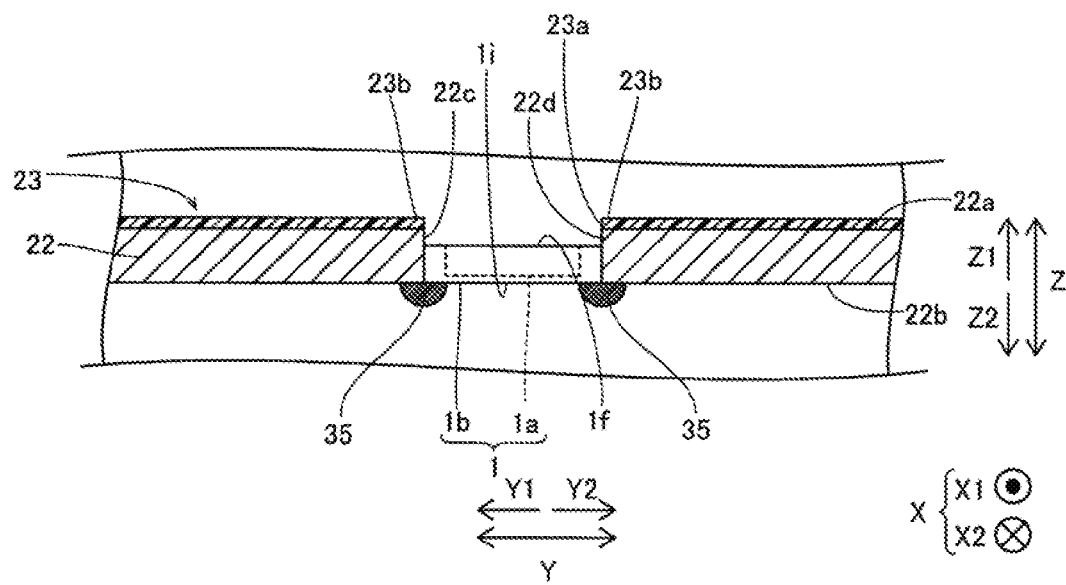
FIG. 20 is an enlarged cross-sectional view of the vicinity of the LED of the backlight unit in accordance with a fifth modification example regarding to the third embodiment.

Specifically, as shown in FIG. 20, the LED 1 is disposed at the inner peripheral surface 22d of the through hole 22c at a position closer to the back surface 22b side. More specifically, the back surface 22b of the substrate 22 and the bottom surface 1i of the LED 1 are roughly flush with each other. In this case, a soldered portion 35 bonds the back surface 22b of the substrate 22 to the bottom surface 1i of the LED 1.

In the third embodiment above, an example is shown in which the LED 1 (the light source) is fixed to the inner peripheral surface 22d of the through hole 22c, however the present invention is not limited to this. The LED 1 (the light source) can fixed to a position different from the inner peripheral surface 22d of the through hole 22c.

Figure 21:
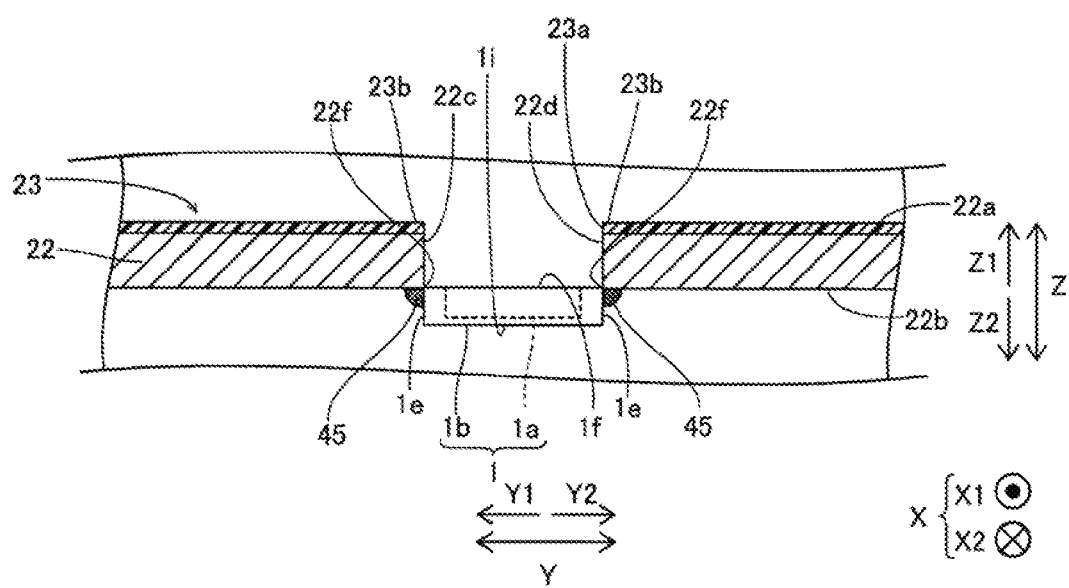
FIG. 21 is an enlarged cross-sectional view of the vicinity of the LED of the backlight unit in accordance with a sixth modification example regarding to the third embodiment.

Specifically, as shown in FIG. 21, the LED 1 is fixed to an opening end 22f of the through hole 22c provided on the back surface 22b side of the substrate 22. In this case, a soldered portion 45 bonds the back surface 22b of the substrate 22 and each of the pair of the side surfaces 1e of the LED 1. The opening end 22f is an example of the "second opening end" of the present disclosure.

In the second embodiment above, an example is shown in which the recess 12b is provided to the substrate 12, however the present invention is not limited to this. The substrate 12 may include a through hole provided below the LED 1 (the light source).

In the third embodiment above, an example is shown in which the soldered portion 25 bonds the inner peripheral surface 22d of the substrate 22 to the LED 1, however, the present invention is not limited to this. For example, the soldered portion 25 may bond the inner peripheral surface 22d and the back surface 22b of the substrate 22 to the LED 1.

In the first embodiment above, an example is shown in which the lengths L1 and L2 of the reflective sheet 3 inserted in the through holes 2b and 2c (the substrate side opening) are greater than ½ (half) of the depths d1 and d2 of the through holes 2b and 2c (the substrate side opening), respectively, however, the present invention is not limited to this. The lengths L1 and L2 of the reflective sheet 3 inserted in the through holes 2b and 2c (the substrate side opening), respectively, may be equal to or less than ½ (half) of the depths d1 and d2 of the through holes 2b and 2c (the substrate side opening), respectively.

In the second embodiment above, an example is shown in which the reflective sheet 13 and the bottom surface 12e of the recess 12b are in contact with each other, however the present invention is not limited to this. The reflective sheet 13 and the bottom surface 12e of the recess 12b may not be in contact with the bottom surface 12e of the recess 12b.

In the first embodiment described above, an example is shown in which the widths W1 and W2 of the through holes 2b and 2c (the substrate side opening) in the Y direction (the first direction) are greater than twice the thickness t of the reflective sheet 3, respectively, however, the present invention is not limited to this. At least one or both of the widths W1 and W2 of the through holes 2b and 2c (the substrate side opening) in the Y direction (the first direction) may be equal to or less than twice the thickness t of the reflective sheet 3 as long as it is greater than the thickness t of the reflective sheet 3.

In the first embodiment above, an example is shown in which the through holes 2b and 2c are provided to extend along the direction (the X direction) in which the pair of the edges 1c of the LED 1 (the light source) extends, however the present invention is not limited to this. For example, the through holes 2b and 2c may be provided to extend along the direction (the Y direction) in which the pair of the edges 1d of the LED 1 (the light source) extends. Also, in the second embodiment above, the exposed portions 12c and 12d may be provided to extend along the pair of the edges 1d of the LED 1.

In the third embodiment above, an example is shown in which as the reflective sheet 23 is expanded by heat, the inner edge portion 23b of the opening 23a (the reflective sheet side opening) overlaps with the end portions 1g and 1h of the package (light-emitting element housing) as viewed from the perpendicular direction, however the present invention is not limited to this. The inner edge portion 23b of the opening 23a (the reflective sheet side opening) can be configured not to overlap with the end portions 1g and 1h of the package 1b (the light-emitting element housing) as viewed from the perpendicular direction when the reflective sheet 23 is expanded by heat. Furthermore, the inner edge portion 23b of the opening 23a (the reflective sheet side opening) can be configured to overlap with only one of the end portions 1g and 1h of the package 1b (the light-emitting element housing) as viewed from the perpendicular direction when the reflective sheet 23 is expanded by heat.

In the first to third embodiments above, examples of the backlight unit of the display device are shown as the lighting device of the present invention, however, the present invention is not limited to this. For example, the present invention may be applied to a lighting device other than the backlight unit of the display device. For example, the present invention may be applied to a display device with plane light emission (an edge-lit type display device).

In the first to third embodiments above, examples of the liquid crystal television device are shown as the display device of the present invention, however, the present invention is not limited to this. For example, the present invention may be applied to a display device other than a liquid crystal television device. For example, the present invention may be applied to a general display device, such as a display device for a PC (personal computer).

In the first to third embodiments above, examples of a configuration in which the plurality of the LEDs 1 (the light sources) are arranged in a matrix in the XY directions are shown, however, the present invention is not limited to this. In the present invention, for example, the plurality of the LEDs 1 (the light sources) may be arranged in a row or in a staggered manner. The plurality of the LEDs 1 (the light sources) may also be arranged according to a predetermined rule.

In the first to third embodiments above, an example is shown in which the light source is an LED, however, the present invention is not limited to this. The light source may be a light emitter other than an LED (e.g., a light bulb, a fluorescent lamp, etc.).

(1) In view of the state of the known technology and in accordance with a first aspect of the present invention, a lighting device comprises a light source, a substrate and a reflective sheet. The light source is mounted on the substrate. The substrate includes a substrate side opening in a vicinity of the light source. The reflective sheet is provided to cover a surface of the substrate. The reflective sheet includes an inner edge portion defining a reflective sheet side opening at a location corresponding to the light source. The substrate side opening is arranged such that the inner edge portion of the reflective sheet is inserted thereto or the light source is fixed thereto. Specifically, the reflective sheet can be configured to expand and contract by heat, for example. The reflective sheet side opening can be formed in an area where the light source is disposed as viewed from a perpendicular direction relative to the surface of the substrate, for example. The substrate side opening can be provided such that the inner edge portion of the reflective sheet is inserted thereto or the light source is fixed thereto so as to avoid contact between the inner edge portion of the reflective sheet in an expanded state by heat and the light source, or so as to avoid expansion of the reflective sheet by heat in a state in which the inner edge portion of the reflective sheet and the light source interfere with each other, for example. Here, the vicinity of the light source means both the position of the light source itself and near the light source.

In the lighting device according to the first aspect of this invention, as described above, the substrate side opening is provided in the vicinity of the light source such that the inner edge portion of the reflective sheet is inserted or the light source is fixed thereto so as to avoid contact between the inner edge portion of the reflective sheet in the expanded state by heat and the light source. Thus, by providing the substrate side opening, contact between the inner edge portion of the reflective sheet and the light source can be avoided when the reflective sheet is expanded by heat. As a result, it is possible to suppress the damage to (and wrinkling of) the inner edge portion of the reflective sheet due to further expanding of the reflective sheet by heat (towards the light source) in a state where the inner edge portion of the reflective sheet is in contact with the light source. Furthermore, by providing the substrate side opening in the vicinity of the light source, even when the inner edge portion of the reflective sheet is arranged so that the inner edge portion of the reflective sheet extends to the vicinity of the light source as viewed from the perpendicular direction, the substrate side opening provided in the vicinity of the light source can avoid contact between the inner edge portion of the reflective and the light source. As a result, exposure of the surface of the substrate in the vicinity of the light source can be suppressed as much as possible, and thus a decrease in the reflection efficiency of the light in the lighting device can be suppressed while suppressing the damage to the reflective sheet (the inner edge portion of the reflective sheet).

(2) In accordance with a preferred embodiment according to the lighting device mentioned above, the substrate side opening is located at a location that overlaps with or is adjacent to the light source as viewed from a perpendicular direction that is perpendicular to the surface of the substrate. Specifically, the substrate side opening can overlap with or be adjacent to the light source as viewed from the perpendicular direction, for example. In this configuration, exposure of the surface of the substrate in the vicinity of the light source can be more reliably suppressed. As a result, a decrease in the reflection efficiency of the light in the lighting device can be more effectively suppressed.

(3) In accordance with a preferred embodiment according to any one of the lighting devices mentioned above, the light source is fixed to the surface of the substrate, the inner edge portion of the reflective sheet is inserted into the substrate side opening, and the substrate side opening is formed by at least one of a first through hole that penetrates the substrate along a perpendicular direction that is perpendicular to the surface of the substrate and a recess that is depressed from the surface of the substrate. In this configuration, by inserting the inner edge portion of the reflective sheet into at least one of the first through hole and the recess, contact between the inner edge portion of the reflective sheet and the light source can be easily avoided.

(4) In accordance with a preferred embodiment according to any one of the lighting devices mentioned above, the reflective sheet is configured such that a thermal expansion amount in a first direction of the reflective sheet is greater than a thermal expansion amount in a second direction of the reflective sheet, with the first direction and the second direction being perpendicular to each other, the light source has a rectangular shape as viewed from the perpendicular direction, and has a pair of edges opposite to each other in the first direction, and the substrate further includes an additional substrate side opening, the substrate side opening and the additional substrate side opening being provided in vicinities of the edges of the light source, respectively. Specifically, the reflective sheet is preferably configured such that, of the first and second directions orthogonal to each other as viewed from the perpendicular direction, the amount of expansion and contraction due to heat in the first direction is greater than the amount of expansion and contraction due to heat in the second direction, for example. The substrate side opening can include a first opening provided in the vicinity of one of the pair of the edges of the light source in the first direction as viewed from the perpendicular direction, and the additional substrate side opening can include a second opening provided separately from the first opening in the vicinity of the other of the pair of the edges, for example. In this configuration, since the amount of expansion and contraction of the reflective sheet due to heat is relatively greater in the first direction, providing two openings in the vicinity of the pair of the edges in the first direction is particularly effective in avoiding contact between the inner edge portion of the reflective sheet and the light source. Here, the vicinity of the edge means both the position of the edge itself and near the edge.

(5) In accordance with a preferred embodiment according to any one of the lighting devices mentioned above, each of the substrate side opening and the additional substrate side opening is provided in a form of a slit extending along a direction in which the edges of the light source extend. In this configuration, the inner edge portion of the reflective sheet inserted into each of the substrate side opening and the additional substrate side opening (first and second openings) can be provided so as to extend along the above-mentioned pair of the edges. As a result, the area of the reflective sheet provided in the vicinity of the light source can be easily enlarged, and thus the formation of an area where the surface of the substrate is exposed in the vicinity of the light source can be minimized as much as possible.

(6) In accordance with a preferred embodiment according to any one of the lighting devices mentioned above, the substrate side opening has a width in the first direction that is greater than twice a thickness of the reflective sheet. Specifically, the width of the substrate side opening in the first direction is greater than twice the thickness of the reflective sheet, for example. In this configuration, compared to the case where the width of the substrate side opening in the first direction is equal to or less than twice the thickness of the reflective sheet, even when a part of the substrate side opening is covered by the light source due to variations in manufacturing (e.g., mounting variations of the light source, variations in the mounting position of the substrate, variations in the position of the substrate side opening, etc.), the inner edge portion of the reflective sheet can be easily inserted into the substrate side opening.

(7) In accordance with a preferred embodiment according to any one of the lighting devices mentioned above, the reflective sheet is configured to expand and contract in a direction along a side surface of the light source that extends in the perpendicular direction while the inner edge portion of the reflective sheet is inserted into the substrate side opening. Specifically, the reflective sheet is configured to expand and contract in a direction along the side surface of the light source that extends in the perpendicular direction by having the inner edge portion of the reflective sheet inserted into the substrate side opening, for example. In this configuration, the inner edge portion of the reflective sheet can be suppressed from expanding towards the side surface side of the light source, and thus contact between the inner edge portion of the reflective sheet and the light source can be easily avoided.

(8) In accordance with a preferred embodiment according to any one of the lighting devices mentioned above, the recess is provided below the light source to only partially overlaps with the light source as viewed from the perpendicular direction, and the inner edge portion of the reflective sheet is inserted into the recess from an exposed portion of the recess that is exposed from the light source as viewed from the perpendicular direction, and extends along a bottom surface of the recess. Specifically, the recess as the substrate side opening is preferably provided below the light source, and is also provided such that a part of the recess overlaps with the light source and other parts are exposed from the light source as viewed from the perpendicular direction, for example. In this configuration, the inner edge portion of the reflective sheet is provided so as to extend along the bottom surface of the recess, thereby suppressing the inner edge portion of the reflective sheet from moving (expanding) towards the light source, and thus contact between the inner edge portion of the reflective sheet and the light source can be easily avoided. Furthermore, by providing the recess in the substrate so that the exposed portion is formed, the inner edge portion of the reflective sheet can be easily inserted into the recess through the exposed portion.

(9) In accordance with a preferred embodiment according to any one of the lighting devices mentioned above, the substrate side opening has a first opening end with a corner that is chamfered. Specifically, the corner of the first opening end of the substrate side opening in which the inner edge portion of the reflective sheet is inserted is chamfered, for example. In this configuration, the reflective sheet can be suppressed from being damaged by the corner of the first opening end of the substrate side opening.

(10) In accordance with a preferred embodiment according to any one of the lighting devices mentioned above, the reflective sheet is inserted into the substrate side opening by a length that is greater than a thickness of the reflective sheet. Specifically, the length of the reflective sheet inserted in the substrate side opening is greater than the thickness of the reflective sheet, for example. In this configuration, compared to the case where the length of the reflective sheet inserted in the substrate side opening is equal to or less than the thickness of the reflective sheet, the reflective sheet can be suppressed from being pulled out of the substrate side opening.

(11) In accordance with a preferred embodiment according to any one of the lighting devices mentioned above, the substrate side opening includes a second through hole that penetrates the substrate along a perpendicular direction that is perpendicular to the surface of the substrate, the substrate includes a back surface provided on the opposite side of the surface, the light source is fixed to the second opening end of the second through hole on a back surface side of the substrate, or is fixed to an inner peripheral surface of the second through hole so as not to protrude from the second through hole to a surface side of the substrate, and the light source is provided to emit light through the second through hole. Specifically, the light source is fixed to the second opening end of the second through hole provided on the back surface side, or is fixed to the inner peripheral surface of the second through hole at a position where it does not protrude to the surface side of the substrate from the second through hole, for example. In this configuration, since the light source does not protrude from the second through hole to the surface side of the substrate, contact between the inner edge portion of the reflective sheet and the light source can be easily avoided when the reflective sheet expands and contracts along the surface of the substrate. In addition, even if the light source is provided on the back surface side of the substrate relative to the surface of the substrate, light is emitted through the second through hole, and thus a decrease in the luminous efficiency of the light source can be suppressed.

(12) In accordance with a preferred embodiment according to any one of the lighting devices mentioned above, the light source includes a light-emitting element and a light-emitting element housing that houses the light-emitting element, and the inner edge portion of the reflective sheet does not overlap with a light-emitting region of the light-emitting element and overlaps with an end portion of the light-emitting element housing as viewed from a perpendicular direction that is perpendicular to the surface of the substrate when the reflective sheet expands along the surface of the substrate. Specifically, the inner edge portion of the reflective sheet does not overlap with a light-emitting region of the light-emitting element and overlaps with an end portion of the light-emitting element housing as viewed from a perpendicular direction that is perpendicular to the surface of the substrate, due to the reflective sheet expanding along the surface of the substrate, for example. In this configuration, when the reflective sheet is expanding, a decrease in the luminous efficiency from the light source (light-emitting region) can be suppressed while suppressing the formation of an area in which the surface of the substrate is exposed.

(13) In accordance with a preferred embodiment according to any one of the lighting devices mentioned above, the light source is disposed at the inner peripheral surface of the second through hole at a position closer to a reflective sheet side. With this configuration, the distance between the light source and the inner edge portion of the reflective sheet can be made relatively small. As a result, when the light is emitted radially from the light source, the spread (width) of the light as it passes through the reflective sheet side opening can be made relatively small. This makes it possible to suppress the light from the light source from being blocked by the inner edge portion of the reflective sheet when the end portion of the light-emitting element housing and the inner edge portion of the reflective sheet overlap with each other as viewed from the perpendicular direction.

(14) In accordance with a preferred embodiment according to any one of the lighting devices mentioned above, the lighting device is further provided with a soldered portion that fixes the light source to the substrate from the back surface side of the substrate, and the soldered portion is provided to bond the light source to at least one of the back surface of the substrate and the inner peripheral surface of the second through hole. In this configuration, the soldered portion is not exposed as viewed from the surface side of the substrate. As a result, the reflected light from the surface side of the substrate can be suppressed from being irradiated onto the soldered portion, and thus light absorption by the soldered portion can be suppressed. Thus, a decrease in the luminous efficiency of the light source can be suppressed.

(15) In view of the state of the known technology and in accordance with a second aspect of the present invention, a display device comprises a display and any one of the lighting devices mentioned above. Specifically, the display device comprises a display, a light source, a substrate and a reflective sheet. The light source emits light to the display. The light source is mounted on the substrate. The substrate includes a substrate side opening in a vicinity of the light source. The reflective sheet is provided to cover a surface of the substrate. The reflective sheet includes a reflective sheet side opening at a location corresponding to the light source. The substrate side opening is arranged such that an inner edge portion of the reflective sheet is inserted thereto or the light source is fixed thereto. Specifically, the reflective sheet can be configured to expand and contract by heat, for example. The reflective sheet side opening can be formed in an area where the light source is disposed as viewed from a perpendicular direction relative to the surface of the substrate, for example. The substrate side opening can be provided such that the inner edge portion of the reflective sheet is inserted thereto or the light source is fixed thereto so as to avoid contact between the inner edge portion of the reflective sheet in an expanded state by heat and the light source, or so as to avoid expansion of the reflective sheet by heat in a state in which the inner edge portion of the reflective sheet and the light source interfere with each other, for example.

In the display device according to the second aspect of this invention, as described above, the substrate side opening is provided in the vicinity of the light source such that the inner edge portion of the reflective sheet is inserted or the light source is fixed so as to avoid contact between the inner edge portion of the reflective sheet in the expanded state by heat and the light source. Thus, by providing the substrate side opening, contact between the inner edge portion of the reflective sheet and the light source can be avoided when the reflective sheet is expanded by heat. As a result, it is possible to suppress the damage to (and wrinkling of) the inner edge portion of the reflective sheet due to further expanding of the reflective sheet by heat (towards the light source) in a state where the inner edge portion of the reflective sheet is in contact with the light source. Furthermore, by providing the substrate side opening in the vicinity of the light source, even when the inner edge portion of the reflective sheet is arranged so that the inner edge portion of the reflective sheet extends to the vicinity of the light source as viewed from the perpendicular direction, the substrate side opening provided in the vicinity of the light source can avoid contact between the inner edge portion of the reflective sheet and the light source. As a result, exposure of the surface of the substrate in the vicinity of the light source can be suppressed as much as possible, and thus it is possible to provide a display device capable of suppressing a decrease in the reflection efficiency of the light in the display device while suppressing damage to the reflective sheet (the inner edge portion of the reflective sheet).

(16) In accordance with a preferred embodiment according to any one of the lighting devices mentioned above, the substrate including an additional substrate side opening, the reflective sheet has an additional inner edge portion defining the reflective sheet side opening, and the inner edge portion and the additional inner edge portion of the reflective sheet are inserted to the substrate side opening and the additional substrate side opening, respectively.

(17) In accordance with a preferred embodiment according to any one of the lighting devices mentioned above, the inner edge portion is bent to extend in a perpendicular direction that is perpendicular to the surface of the substrate, and is inserted into the substrate side opening.

(18) In accordance with a preferred embodiment according to any one of the lighting devices mentioned above, the inner edge portion of the reflective sheet is inserted into the substrate side opening such that the inner edge portion of the reflective sheet at least partially overlaps with the light source as viewed from a perpendicular direction that is perpendicular to the surface of the substrate.

(19) In accordance with a preferred embodiment according to any one of the lighting devices mentioned above, the light source is entirely disposed within the substrate side opening between the surface of the substrate and a back surface of the substrate on the opposite side of the surface of the substrate.

(20) In accordance with a preferred embodiment according to any one of the lighting devices mentioned above, the light source is configured to emit light through the reflective sheet side opening.

According to the present invention, it is possible to suppress a decrease in the reflection efficiency of the light in the lighting device (display device) while suppressing damage to the reflective sheet (inner edge portion of the reflective sheet) as described above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a liquid crystal television device in an upright position. Accordingly, these directional terms, as utilized to describe the liquid crystal television device, should be interpreted relative to a liquid crystal television device in an upright position on a horizontal surface.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lighting device comprising:
a light source;
a substrate on which the light source is mounted, the substrate including a substrate side opening in a vicinity of the light source; and
a reflective sheet provided to cover a surface of the substrate, the reflective sheet including an inner edge portion defining a reflective sheet side opening at a location corresponding to the light source, the inner edge portion being inserted to the substrate side opening,
the light source being arranged to overlap with the reflective sheet side opening as viewed from a perpendicular direction that is perpendicular to the surface of the substrate.

2. The lighting device according to claim 1, wherein the substrate side opening is located at a location that overlaps with or is adjacent to the light source as viewed from the perpendicular direction.

3. The lighting device according to claim 1, wherein the light source is fixed to the surface of the substrate, and the substrate side opening is formed by at least one of a first through hole that penetrates the substrate along the perpendicular direction and a recess that is depressed from the surface of the substrate.

4. The lighting device according to claim 3, wherein the reflective sheet expands and contracts in a direction along a side surface of the light source that extends in the perpendicular direction while the inner edge portion of the reflective sheet is inserted into the substrate side opening.

5. The lighting device according to claim 3, wherein the recess is provided below the light source to only partially overlaps with the light source as viewed from the perpendicular direction, and
the inner edge portion of the reflective sheet is inserted into the recess from an exposed portion of the recess that is exposed from the light source as viewed from the perpendicular direction, and extends along a bottom surface of the recess.

6. The lighting device according to claim 3, wherein the substrate side opening has a first opening end with a corner that is chamfered.

7. The lighting device according to claim 3, wherein the reflective sheet is inserted into the substrate side opening by a length that is greater than a thickness of the reflective sheet.

8. A display device comprising:
a display; and
the lighting device according to claim 1.

9. The lighting device according to claim 1, wherein the inner edge portion of the reflective sheet is inserted into the substrate side opening such that the inner edge portion of the reflective sheet at least partially overlaps with the light source as viewed from the perpendicular direction.

10. A lighting device comprising:
a light source;
a substrate on which the light source is mounted, the substrate including a substrate side opening in a vicinity of the light source, the substrate side opening being formed by at least one of a first through hole that penetrates the substrate along a perpendicular direction that is perpendicular to the surface of the substrate and a recess that is depressed from the surface of the substrate; and
a reflective sheet provided to cover a surface of the substrate, the reflective sheet including an inner edge portion defining a reflective sheet side opening at a location corresponding to the light source, the inner edge portion being inserted to the substrate side opening,
the reflective sheet being configured such that a thermal expansion amount in a first direction of the reflective sheet is greater than a thermal expansion amount in a second direction of the reflective sheet, with the first direction and the second direction being perpendicular to each other,
the light source being fixed to the surface of the substrate, the light source having a rectangular shape as viewed from the perpendicular direction, and having a pair of edges opposite to each other in the first direction, and
the substrate further including an additional substrate side opening, the substrate side opening and the additional substrate side opening being provided in vicinities of the edges of the light source, respectively.

11. The lighting device according to claim 10, wherein each of the substrate side opening and the additional substrate side opening is provided in a form of a slit extending along a direction in which the edges of the light source extend.

12. The lighting device according to claim 10, wherein the substrate side opening has a width in the first direction that is greater than twice a thickness of the reflective sheet.

13. A lighting device comprising:
a light source;
a substrate on which the light source is mounted, the substrate including a substrate side opening in a vicinity of the light source, the substrate side opening including a through hole that penetrates the substrate; and
a reflective sheet provided to cover a surface of the substrate, the reflective sheet including an inner edge portion defining a reflective sheet side opening at a location corresponding to the light source,
the light source being fixed to the through hole of the substrate.

14. The lighting device according to claim 13, wherein the through hole penetrates the substrate along a perpendicular direction that is perpendicular to the surface of the substrate,
the substrate includes a back surface on the opposite side of the surface,
the light source is fixed to an opening end of the through hole on a back surface side of the substrate, or is fixed to an inner peripheral surface of the through hole so as not to protrude from the through hole to a surface side of the substrate, and the light source is provided to emit light through the through hole.

15. The lighting device according to claim 14, wherein the light source includes a light-emitting element and a light-emitting element housing that houses the light-emitting element, and the inner edge portion of the reflective sheet does not overlap with a light-emitting area of the light-emitting element and overlaps with an end portion of the light-emitting element housing as viewed from the perpendicular direction when the reflective sheet expands along the surface of the substrate.

16. The lighting device according to claim 14, wherein the light source is disposed at the inner peripheral surface of the through hole at a position closer to a reflective sheet side.

17. The lighting device according to claim 14, further comprising a soldered portion fixing the light source to the substrate from the back surface side of the substrate, the soldered portion being provided to bond the light source to at least one of the back surface of the substrate and the inner peripheral surface of the through hole.

18. The lighting device according to claim 13, wherein the light source is entirely disposed within the through hole of the substrate between the surface of the substrate and a back surface of the substrate on the opposite side of the surface of the substrate.

19. The lighting device according to claim 18, wherein the light source emits light through the reflective sheet side opening.

20. A lighting device comprising:

a light source;

a substrate on which the light source is mounted, the substrate including a substrate side opening and an additional substrate side opening in a vicinity of the light source; and a reflective sheet provided to cover a surface of the substrate, the reflective sheet including an inner edge portion and an additional inner edge portion defining a reflective sheet side opening at a location corresponding to the light source, the inner edge portion and the additional inner edge portion of the reflective sheet being inserted to the substrate side opening and the additional substrate side opening, respectively.

21. A lighting device comprising:

a light source;

a substrate on which the light source is mounted, the substrate including a substrate side opening in a vicinity of the light source; and a reflective sheet provided to cover a surface of the substrate, the reflective sheet including an inner edge portion defining a reflective sheet side opening at a location corresponding to the light source, the inner edge portion being bent to extend in a perpendicular direction that is perpendicular to the surface of the substrate, and being inserted into the substrate side opening.

* * * * *